(12) United States Patent
Grab et al.

(10) Patent No.: US 9,129,087 B2
(45) Date of Patent: Sep. 8, 2015

(54) SYSTEMS AND METHODS FOR MANAGING DIGITAL RIGHTS BASED ON A UNION OR INTERSECTION OF INDIVIDUAL RIGHTS

(75) Inventors: Eric W. Grab, San Diego, CA (US); Kim R. Dykeman, San Francisco, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 13/341,506

(22) Filed: Dec. 30, 2011

(65) Prior Publication Data

US 2013/0174273 A1    Jul. 4, 2013

(51) Int. Cl.
*G06F 17/30* (2006.01)
*G06F 21/00* (2013.01)
*G06F 21/10* (2013.01)

(52) U.S. Cl.
CPC ............... *G06F 21/00* (2013.01); *G06F 21/10* (2013.01)

(58) Field of Classification Search
CPC ......... G06F 21/10; G06F 21/31; G06F 21/00; H04L 2463/101
USPC ......................................................... 726/28
See application file for complete search history.

(56) References Cited

U.S. PATENT DOCUMENTS

| | | | |
|---|---|---|---|
| 6,177,931 B1 | 1/2001 | Alexander et al. | |
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,660,416 B1 | 2/2010 | Kline | |
| 7,761,892 B2 | 7/2010 | Ellis et al. | |
| 7,774,819 B2 | 8/2010 | Perez | |
| 7,778,980 B2 | 8/2010 | Bodin et al. | |
| 7,801,847 B2 | 9/2010 | Kiilerich et al. | |
| 7,822,644 B2 | 10/2010 | Alberth et al. | |
| 7,996,754 B2 | 8/2011 | Bodin et al. | |
| 8,046,801 B2 | 10/2011 | Ellis et al. | |
| 8,346,867 B2 * | 1/2013 | Sharkey ........................ 709/204 |
| 8,484,299 B2 | 7/2013 | Mizosoe et al. | |
| 8,631,508 B2 | 1/2014 | Woods | |

(Continued)

FOREIGN PATENT DOCUMENTS

| | | |
|---|---|---|
| EP | 1069491 A2 | 1/2001 |
| EP | 1081574 A1 | 3/2001 |

(Continued)

OTHER PUBLICATIONS

"International Application Serial No. PCT/US2010/051448, International Preliminary Report on Patentability mailed May 31, 2012", 7 pgs.

(Continued)

*Primary Examiner* — Kambiz Zand
*Assistant Examiner* — Aubrey Wyszynski
(74) *Attorney, Agent, or Firm* — Ropes & Gray LLP

(57) ABSTRACT

Systems and methods are provided for aggregating digital access rights owned by a group of individuals and for correlating access rights to physical presence of the users to more accurately control access and distribution of copyrighted media. The intersection of content authorization information associated with each individual of a group may be analyzed. The aggregation and analysis of digital access rights enables multiple users to share the cost of a digital access right to access a content asset in a common area.

20 Claims, 15 Drawing Sheets

(56) References Cited

U.S. PATENT DOCUMENTS

| | | |
|---|---|---|
| 2002/0099695 A1 | 7/2002 | Abajian et al. |
| 2002/0174428 A1 | 11/2002 | Agnihotri et al. |
| 2002/0174430 A1 | 11/2002 | Ellis et al. |
| 2003/0110499 A1 | 6/2003 | Knudson et al. |
| 2003/0141987 A1 | 7/2003 | Hayes |
| 2004/0034650 A1 | 2/2004 | Springer et al. |
| 2004/0073920 A1 | 4/2004 | Yuen et al. |
| 2004/0220926 A1 | 11/2004 | Lamkin et al. |
| 2005/0060266 A1 | 3/2005 | DeMello et al. |
| 2005/0091169 A1 | 4/2005 | Peinado et al. |
| 2005/0108320 A1 | 5/2005 | Lord et al. |
| 2005/0114896 A1 | 5/2005 | Hug et al. |
| 2005/0138576 A1* | 6/2005 | Baumert et al. ............... 715/862 |
| 2005/0210135 A1 | 9/2005 | Abrahams et al. |
| 2005/0251827 A1 | 11/2005 | Ellis et al. |
| 2006/0107330 A1 | 5/2006 | Ben-Yaacov et al. |
| 2006/0161538 A1 | 7/2006 | Kiilerich |
| 2006/0195513 A1 | 8/2006 | Rogers et al. |
| 2007/0073704 A1 | 3/2007 | Bowden et al. |
| 2007/0078993 A1 | 4/2007 | Issa |
| 2007/0083915 A1 | 4/2007 | Janakiraman et al. |
| 2007/0156726 A1 | 7/2007 | Levy |
| 2007/0192684 A1 | 8/2007 | Bodin et al. |
| 2007/0220024 A1 | 9/2007 | Putterman et al. |
| 2007/0226238 A1 | 9/2007 | Kiilerich et al. |
| 2007/0239611 A1 | 10/2007 | Blum |
| 2007/0276866 A1 | 11/2007 | Bodin et al. |
| 2008/0103977 A1 | 5/2008 | Khosravy et al. |
| 2008/0109366 A1 | 5/2008 | Read |
| 2008/0109368 A1 | 5/2008 | Read et al. |
| 2008/0113787 A1* | 5/2008 | Alderucci et al. ............... 463/29 |
| 2008/0134043 A1 | 6/2008 | Georgis et al. |
| 2008/0140433 A1 | 6/2008 | Levy et al. |
| 2008/0147650 A1 | 6/2008 | Marsh |
| 2008/0155453 A1 | 6/2008 | Othmer |
| 2008/0195871 A1 | 8/2008 | Peinado et al. |
| 2008/0276279 A1 | 11/2008 | Gossweiler et al. |
| 2009/0019364 A1 | 1/2009 | Cho et al. |
| 2009/0049074 A1 | 2/2009 | Dara-Abrams et al. |
| 2009/0187657 A1 | 7/2009 | Uemitsu |
| 2009/0201896 A1* | 8/2009 | Davis et al. ................... 370/338 |
| 2009/0271826 A1 | 10/2009 | Lee et al. |
| 2010/0067705 A1 | 3/2010 | Boccon-Gibod et al. |
| 2010/0071005 A1 | 3/2010 | Kusunoki |
| 2010/0121941 A1 | 5/2010 | Harrang et al. |
| 2010/0153885 A1 | 6/2010 | Yates |
| 2010/0185765 A1 | 7/2010 | Kang et al. |
| 2010/0251305 A1 | 9/2010 | Kimble et al. |
| 2010/0293058 A1 | 11/2010 | Maher et al. |
| 2010/0299522 A1 | 11/2010 | Khambete |
| 2011/0069940 A1 | 3/2011 | Shimy et al. |
| 2011/0083073 A1 | 4/2011 | Atkins et al. |
| 2011/0116376 A1 | 5/2011 | Pacella et al. |
| 2011/0125585 A1 | 5/2011 | Dow et al. |
| 2011/0125753 A1 | 5/2011 | Dow et al. |
| 2011/0125774 A1 | 5/2011 | Dow et al. |
| 2011/0125809 A1 | 5/2011 | Woods et al. |
| 2011/0126104 A1 | 5/2011 | Woods et al. |
| 2011/0126230 A1 | 5/2011 | Dow et al. |
| 2011/0264743 A1* | 10/2011 | Baumert et al. ............... 709/204 |
| 2012/0174148 A1 | 7/2012 | Hon et al. |
| 2013/0145284 A1* | 6/2013 | Anantharaman et al. ..... 715/753 |
| 2013/0174223 A1 | 7/2013 | Dykeman et al. |
| 2013/0174273 A1 | 7/2013 | Grab et al. |

FOREIGN PATENT DOCUMENTS

| | | |
|---|---|---|
| EP | 1162810 | 12/2001 |
| WO | WO 00/23926 | 4/2000 |
| WO | WO 00/56066 | 9/2000 |
| WO | WO 00/58895 | 10/2000 |
| WO | WO 01/53994 | 7/2001 |
| WO | WO 01/67317 | 9/2001 |
| WO | WO 03/42866 | 5/2003 |
| WO | WO 2004/044821 | 5/2004 |
| WO | WO 2005/015429 | 2/2005 |
| WO | WO 2009/107320 | 9/2009 |
| WO | WO 2011/062688 | 5/2011 |
| WO | WO 2011/062689 | 5/2011 |
| WO | WO 2011/062690 | 5/2011 |
| WO | WO 2011/062691 | 5/2011 |
| WO | WO 2011/163177 | 12/2011 |

OTHER PUBLICATIONS

"International Application Serial No. PCT/US2010/051448, Search Report mailed Feb. 11, 2011", 5 pgs.

"International Application Serial No. PCT/US2010/051448, Written Opinion mailed Feb. 11, 2011", 5 pgs.

"International Application Serial No. PCT/US2010/051493, Preliminary Report on Patentability mailed May 31, 2012", 16 pgs.

"International Application Serial No. PCT/US2010/051493, Search Report mailed Dec. 23, 2010", 5 pgs.

"International Application Serial No. PCT/US2010/051493, Written Opinion mailed Dec. 23, 2010", 5 pgs.

"International Application Serial No. PCT/US2010/051506, Search Report mailed Feb. 10, 2011", 5 pgs.

"International Application Serial No. PCT/US2010/051506, Written Opinion mailed Feb. 10, 2011", 5 pgs.

"International Application Serial No. PCT/US2010/051511, Search Report mailed Jan. 24, 2011", 5 pgs.

"International Application Serial No. PCT/US2010/051511, Written Opinion mailed Jan. 24, 2011", 5 pgs.

"Spyglass Prism", Spyglass Prism. Concepts and Applications, XP002907213,(Jan. 1, 1997), 8 pgs.

Ma, W. Y, et al., "Framework for adaptive content delivery in heterogeneous network environments", XP002168331, [Online]. Retrieved from the Internet: <URL:http://www.cooltown.hp.com/papers/adcon/MMCN2000>, (Jan. 24, 2000).

\* cited by examiner

SYSTEMS AND METHODS FOR MANAGING DIGITAL RIGHTS BASED ON A UNION OR INTERSECTION OF INDIVIDUAL RIGHTS

BACKGROUND OF THE DISCLOSURE

Traditional DRM systems may assign an access right for a content asset to a user that enables the user to access the content asset on a personal user device. Traditional DRM systems are deficient in enabling a group of users, each of whom may own an access right to a content asset, to share their access rights.

SUMMARY OF THE DISCLOSURE

In view of the foregoing, methods and systems for aggregating content authorization information associated with a group of users by analyzing the intersection of individual access rights or permissions, and correlating access rights to physical presence of the users to more accurately control access and distribution of copyrighted content, are provided.

A system may first detect or identify each of a number of users within a predetermined proximity of a shared media equipment device. The system may then retrieve content authorization information associated with each of the identified users. From the content authorization information, the system may determine whether each of the users is authorized to access a content asset that will be presented on the shared media equipment device. In response to determining that each of the identified users is authorized to access the content asset, the system may enable access to the content asset on the shared media equipment device.

In some implementations, the system may use the retrieved content authorization information to determine an intersection of access rights and permissions among the content authorization information associated with all of the identified users. From this intersection of access rights, the system may determine whether all the identified users are authorized to access a particular content asset.

In some embodiments, the content authorization information may include permission information, which may be part of an access right or independent of an access right. Permission information may impose further restrictions on the type of content assets that may be accessed by a user. Permission information may include parental control information, distributor restriction information, or any other suitable information that limits access of the content asset. The permission information associated with different identified users may be analyzed to determine an intersection of permission information, similar to the analysis described above for access rights. From this intersection of access rights, the system may determine whether all the identified users are authorized to access a particular content asset.

In some implementations, content authorization information may include an access right to access content which requires authorization, received from a web server, from a provider of the content. A user device may periodically obtain access right information from a web server to enable access to a content asset on a user device.

In some implementations, content authorization information may include an access right to access content that does not require authorization to be retrieved from a web server. The access right may include a hash code based on a first hardware configuration of a first user device. If the access right is transferred to a second user device having a second hardware configuration different from the first hardware configuration, control circuitry of the second user device may not enable access to the content asset on the second user device if the control circuitry determines that the hash code of the access right does not match a hash code calculated based on the hardware configuration of the second user device.

In some implementations, the system may display to the detected users a listing of content assets corresponding to the intersection of access rights or permissions, to indicate what content assets may be commonly accessed by all identified users. In response, a content asset may be selected by one or more of the users for access on the shared media equipment device.

In some implementations, the system may enable unauthorized users to purchase an access right to a content asset in order to access the content asset on the shared media equipment device.

In some implementations, biometric devices may be used to detect or identify the users, and verify the number of users within the predetermined proximity of the shared media equipment device. The biometric devices may assist in the enforcement of access rights by detecting potential unauthorized eavesdroppers within the predetermined proximity of the shared media equipment device.

DETAILED DESCRIPTION OF EMBODIMENTS

Figure 1:
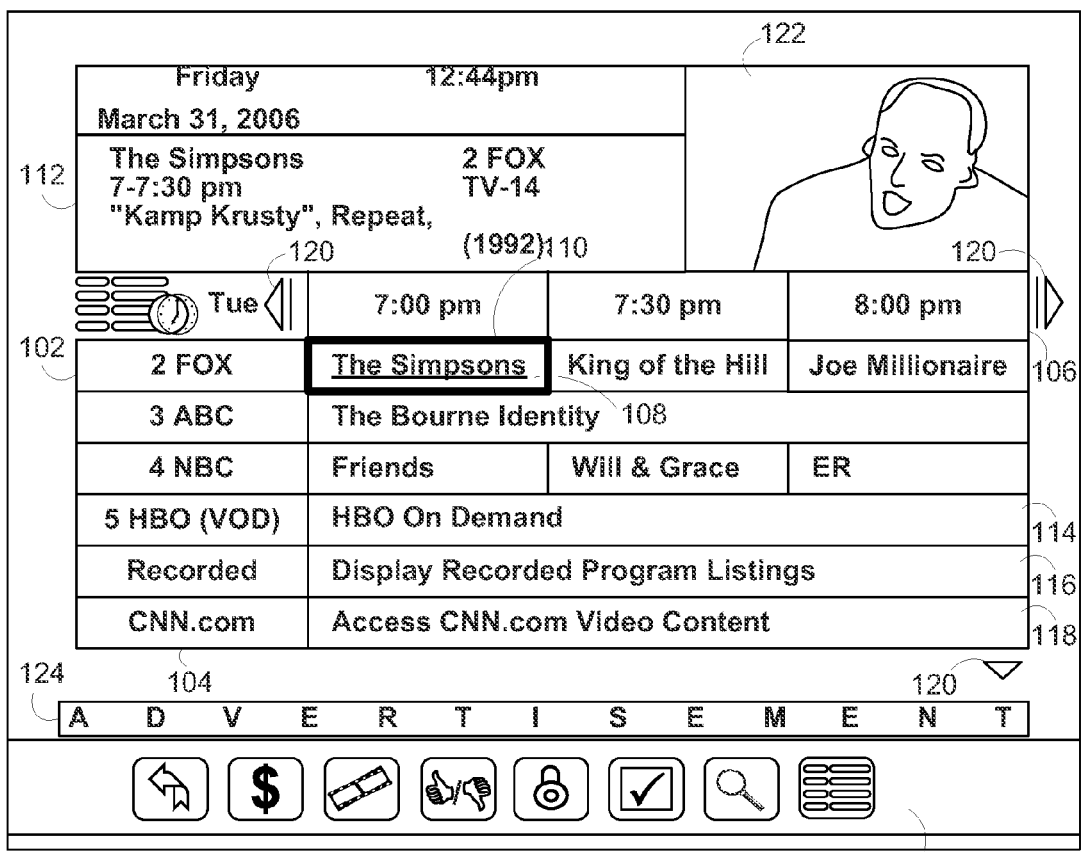
FIG. 1 shows an illustrative interactive media guidance application display screen in accordance with one embodiment of the present disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content. As referred to herein, the term "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing content on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
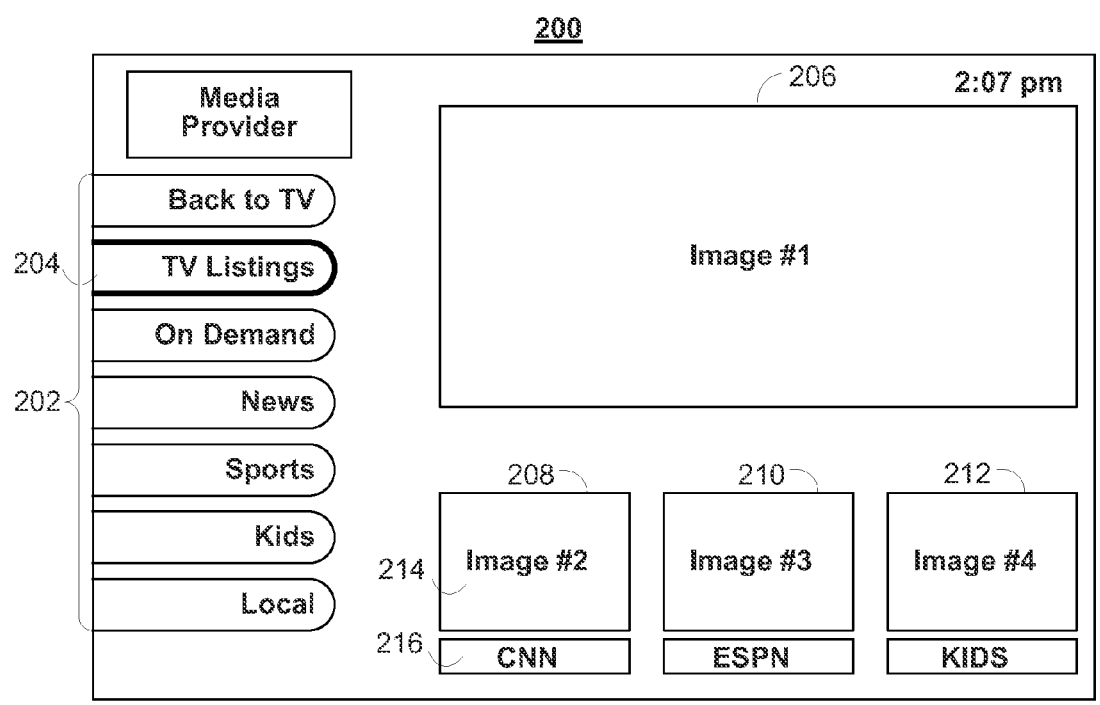
FIG. 2 shows another illustrative interactive media guidance application display screen in accordance with one embodiment of the present disclosure.

FIGS. 1-2 show illustrative display screens that may be used to provide media guidance data. The display screens shown in FIGS. 1-2 and 6-9 may be implemented on any suitable user equipment device or platform. While the displays of FIGS. 1-2 and 6-9 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

In some embodiments, an access right may be required to view a content asset shown in the grid of FIG. 2. For example, a subscription is often required to view an on-demand asset 114, recorded asset 115 or internet content asset 116. In some implementations, a user may purchase an access right to access a content asset.

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, options to request content authorization information to access a content asset, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

User profile information may be information that identifies or indicates characteristics of a particular user. User profile information may include name, gender, age, race, preference, mood, status, a unique identification code or any other suitable information indicating characteristics of a user. Preference information may indicate favorite media related information. For example, preference information may include a user's favorite genre or category. Preference information may also indicate a user's most commonly accessed content asset. For example, preference information may indicate that a user accesses a particular song more often than any other songs on a media equipment device or personal user device. The user profile information may be entered by a user, or learned from tracking access habits of a user. For example, a user may enter profile information into a user device. A user device may also track usage statistics and update profile information. For example, an mp3 player may tally the different genres of content accessed by a user. User profile information may be used to assist in ranking content assets or content that a user is authorized to access. Methods and systems for using user profile information have been described in detail in U.S. Pat. No. 6,177,931, issued Jan. 23, 2011, which is hereby incorporated by reference herein in its entirety.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
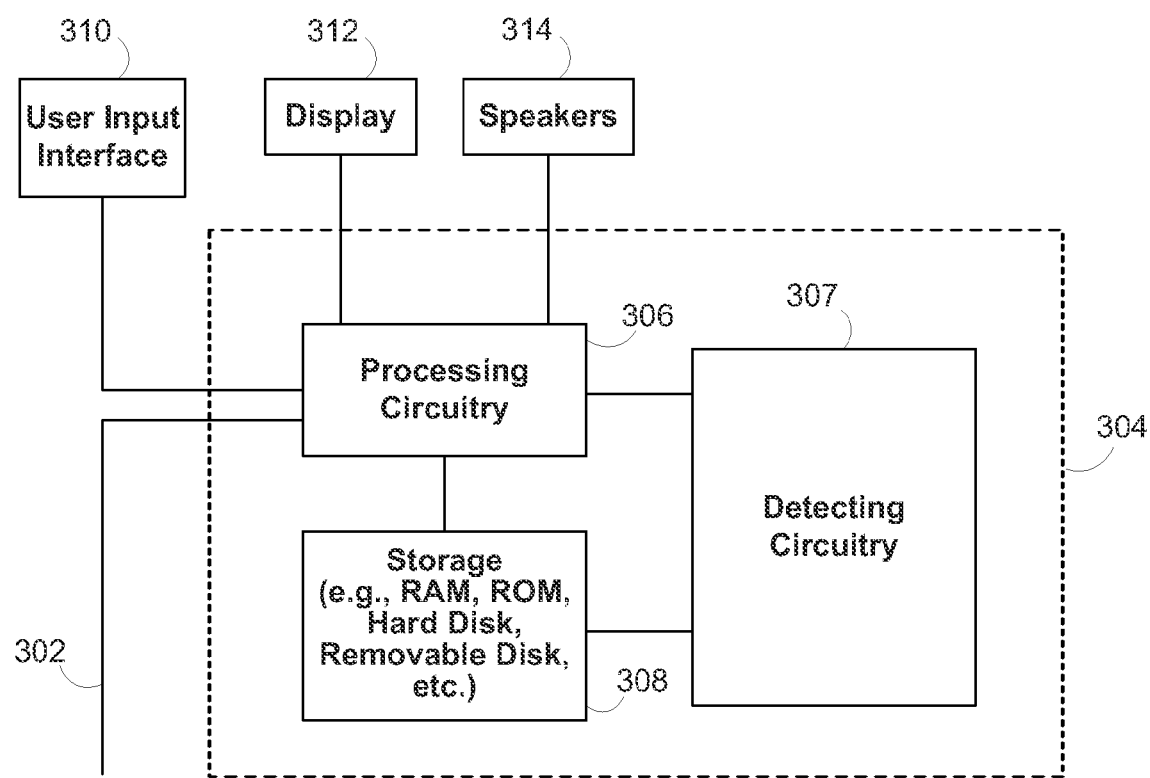
FIG. 3 illustrates an example of a user device that may be used in accordance with some embodiments of the present disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which may include processing circuitry 306, detecting circuitry 307, and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308).

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications network or path (which is described in more detail in connection with FIG. 4). In addition, communications circuitry may include circuitry that enables peer-to-peer communication of user equipment devices, or communication of user equipment devices in locations remote from each other (described in more detail below).

In some embodiments, control circuitry 304 may include detecting circuitry 307 which may be capable of detecting and/or identifying a user or users without requiring the user or users to make any affirmative actions by using any suitable biometric recognition technique, such as, facial recognition, heat signature recognition, odor recognition, scent recognition, body shape recognition, voice recognition, behavioral recognition, or any other suitable biometric recognition technique. In some embodiments detecting circuitry may detect or identify a user device using wireless detection techniques, as will be described in further detail below. For example, detecting circuitry 307 may detect and identify users using these techniques while the users are within a measurable distance to a media device. The measurable range may be limited by ability of the detecting circuitry to resolve or measure features. For example, the measurable range from which a camera may resolve two spaced points may be limited based on optical resolution of the camera. For example, the measurable range from which a wireless antenna may be able to detect a received signal above background noise may depend on the initial intensity of the transmitted signal and an absorption coefficient of the surround transmission medium. In some embodiments, users may be detected and/or identified using any other suitable biometric recognition technique that may in some embodiments require the users to be within a measurable range to an electronic device, for example, iris recognition, retinal recognition, palm recognition, finger print recognition, or any other suitable technique.

Detecting circuitry 307, by using wireless detection techniques, may also be capable of detecting and/or identifying a user or users based on recognition and/or identification of a media device (e.g., a mobile device, such as an RFID device or mobile phone) that may be associated with the user or users. Detecting circuitry 307 may recognize and identify such a device using any suitable means, for example, radio-frequency identification, Bluetooth, Wi-Fi, WiMax, internet protocol, infrared signals, any other suitable IEEE, industrial, or proprietary communication standards, or any other suitable electronic, optical, or auditory communication means. In some embodiments, detecting circuitry may detect a user. For example, detecting circuitry 307 may determine that a user is within a predetermined detection region of an electronic device, identify the user, and add the user to a list of active users at the electronic device. The detection and identification of users as described herein does not require any affirmative action on the part of the user beyond, in some embodiments, the configuration of such methods and systems. For example, any detection and identification of users is done automatically by electronic devices. In some embodiments, detecting circuitry may detect a user device. For example, detecting circuitry 307 may determine by using wireless detection techniques that a user device is within a wireless detection region, and add the user device to a list of user devices at the electronic device.

Detecting circuitry 307 may include any suitable hardware and/or software to perform detection and identification operations. For example, detecting circuitry 307 may include infrared, optical, audio and/or radio-frequency receivers and/or transmitters. Detecting circuitry 307 may additionally, or alternatively, include one or more of a measurement device such as a microphone and/or camera to detect audible and/or visual information, respectively. The microphone may be capable of receiving sounds within the audible range and/or outside the audible range. The camera may be capable of capturing information within the visual spectrum and/or outside the visual spectrum. For example, the camera may be able to capture infrared information, ultraviolet information, or any other suitable type of information. Detecting circuitry 307 may additionally, or alternatively, include palm, fingerprint, and/or retinal readers for detecting and/or identifying users. In some embodiments, detecting circuitry may communicate to processing circuitry 306 and/or storage 308 various detection and/or identification mechanisms indicating whether a user is detected and/or identified at a particular device.

For example, using an infrared (IR) camera and light source, processing circuitry 306 may generate a three dimensional map of an area. A plurality of IR beams may each be modulated and encoded to be distinguishable, transmitted from the IR light source and directed at various points in an area. Each of the beams may reflect off objects in the room back towards the camera. Depending on the distance traveled by each light beam, the time-of-flight, or time traveled by each light beam may vary. If the IR camera and light source are placed side by side, travel time of the light beam may correlate to the distance of an object from the light source and camera. The time of flight may be measured as the time between transmission of the encoded beam from the light source and detection of the encoded beam at the camera. By correlating the time-of-flight of beams, and the initial direction of the beam, processing circuitry 306 and/or detecting circuitry 307 may generate the three dimensional map of the area. Based on the three dimensional map, control circuitry 304 may detect and identify distinct bodies of users, and determine distance of the body from the biometric device. Using color cameras and face detection, control circuitry 304 may detect or identify users.

Using microphones and voice recognition, control circuitry 304 may detect or identify users based on the physical characteristics of their vocal tract through voice recognition or identification. Using a sound source and an array of microphones, control circuitry 304 may determine information about the shape of the area surrounding the biometric device through acoustic localization, similar to the time-of-flight method described above in reference to IR light. For example, a sound source may be located near an array of microphones. A sound broadcast from the sound source may propagate as a wave front away from the source. As the wave front impacts an object, portions of the wave front may be reflected toward the sound source and array of microphones. Depending on the position of the object, the reflected sound may arrive at the microphone at different times. For example, the reflected sound may arrive at a closer microphone in a shorter amount of time than at a farther microphone. Based on the time or phase difference in arrival time at various microphones, total travel time of the sound, and positions of the microphones it may be possible to generate a spatial areal map. Location of objects may be determined based on the spatial areal map generated via acoustic localization, IR time-of-flight, any other suitable mapping method, or any combination thereof. It should be understood that various biometric detection techniques and devices may be used alone, or in combination to supplement each other to more accurately identify or detect users.

In some embodiments, detecting circuitry 307 may use any suitable method to determine the distance, trajectory, and/or location a user is at in relation to a media device. For example, a media device may use received signal strength indication (RSSI) from a user's mobile device to determine the distance the user is to the media device. For example, RSSI values may be triangulated to determine a user's location. The media device may also use, for example, triangulation and/or time difference of arrival determination of appropriate information to determine a user's location in relation to a media device. For example, time difference of arrival values of sounds emanating from a user may be determined. In some embodiments, any suitable image processing, video processing, and/or computer vision technique may be used to determine a user's distance, trajectory, and/or location in relation to a media device. A user's distance, trajectory, and/or location in relation to a media device may be determined using any suitable method.

In some embodiments, processing circuitry 306 may determine a location based on global positioning system (GPS) measurements, or in the case of cellular telephones, measurements based on cell-tower signals, done by detecting circuitry 307. Processing circuitry 306 may use these measurements to determine location coordinates which may be transmitted to other media devices.

As referred to below, an identified user may refer to a user who may be recognized sufficiently by a device to associate the user with a user profile. In some embodiments, the user may be associated with a group of users, as opposed to, or in addition to being associated with a unique user profile. For example, the user may be associated with the user's family, friends, age group, sex, and/or any other suitable group. A detected user may refer to a user whose presence is detected by a device, but who is not yet identified by the device.

Memory may be an electronic storage device provided as storage 308 that is part of control circuitry 304. As referred to herein, the phrase "electronic storage device" or "storage device" should be understood to mean any device for storing electronic data, computer software, database or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, nonvolatile memory, quantum storage devices, gaming consoles, gaming media, or any other suitable fixed or removable storage devices, and/or any combination of the same. Storage 308 may be used to store various types of content described herein as well as media guidance information, described above, and guidance application data, described above including a list of active users at a media device, a list of past users at a media device, content authorization information, or other data used in operating the guidance application or DRM system. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or combination of user input interfaces. User input interface 310 may communicate with one or more media devices. In some embodiments, user input interface 310 may be a remote control with pressure-sensitive buttons. Control circuitry 304 may recognize different amounts of pressure applied to the pressure-sensitive buttons and adjust navigation through, for example, the guidance application. For example, the amount of pressure applied may adjust the speed of scrolling through guidance application listings, such that when less pressure is applied, the listings scroll more slowly and when more pressure is applied, the listings scroll more quickly. The pressure-sensitive buttons may control any portion of the guidance application or a media device in any suitable manner.

In some embodiments, user input interface 310 may be incorporated into a mobile device, such as a mobile phone. In such embodiments, user input interface 310 may obtain appropriate commands, information, and/or updates associated with a user or media device, or any other suitable information via the cellular phone network.

Figure 4:
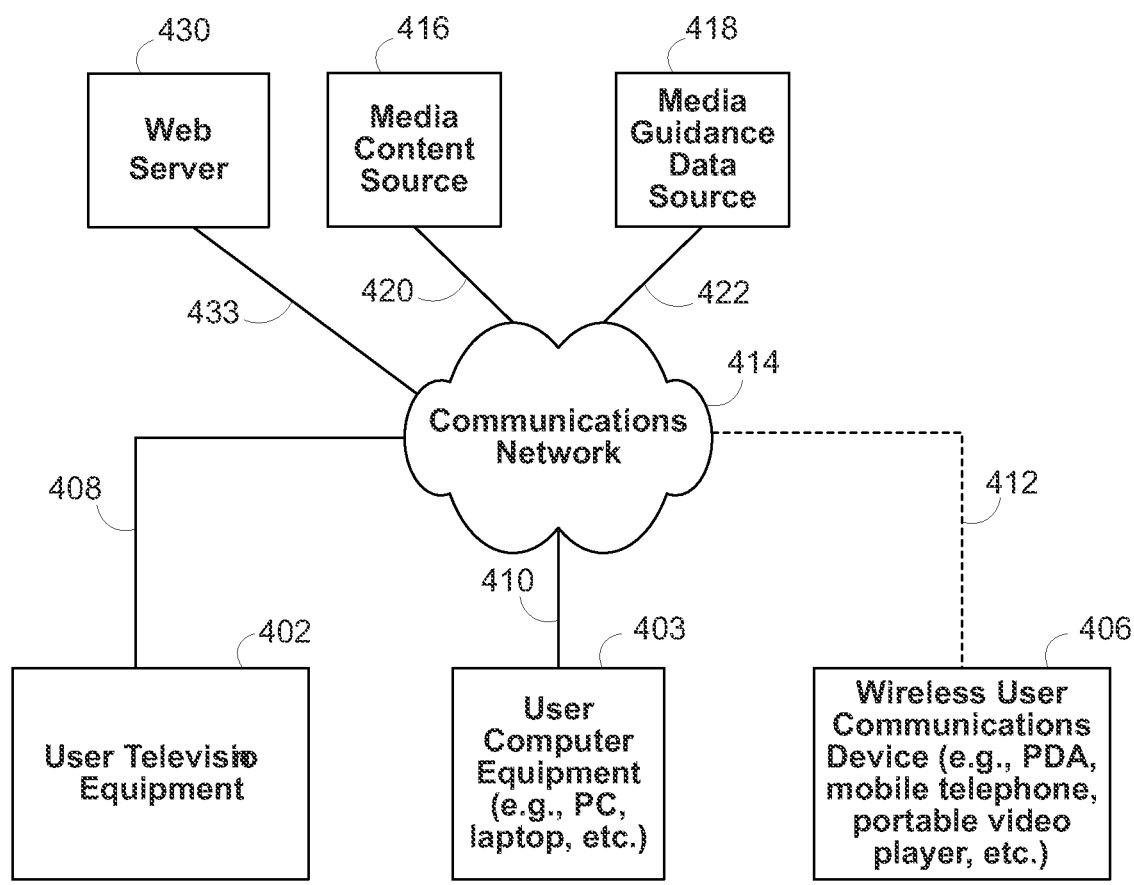
FIG. 4 illustrates an example of a system that may be used in accordance with some embodiments of the present disclosure.

In some embodiments, user input interface 310 may communicate with media devices using a communications path as described in reference to FIG. 4. For example, user input interface 310 that may be incorporated into a user's mobile phone may communicate with media devices using a wireless communications path. In some embodiments, user input interface 310 may communicate with an intermediate device that may convert any suitable communication means to any other suitable communication means. For example, a user may attempt to scroll through a guidance application using the user's mobile phone incorporated with user input interface 310. User input interface 310 may output wireless packets to communicate with user's scroll instructions. An intermediate device may receive the wireless packets and in turn transmit infrared packets to control circuitry 304.

In some embodiments, user input interface 310 may store, transmit, and/or receive information associated with and/or identifying a particular user or users. This information may be used by detecting circuitry 307 to detect and/or identify that the user associated with the information is within a predetermined detection region of a media device. The user may then be added to a list of active users at the media device and/or logged into the media device.

Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

In some embodiments, control circuitry 304 may retrieve one or more user selected programs that are provided by a content source. Control circuitry 304 may instruct a storage device 308 to store the content provided by the content source during the scheduled broadcast time (e.g., having a scheduled start time and a scheduled end time) of the program selected for recording.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, multiple-user use and access configuration options, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user or system operator, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTE is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

System 400 may include a web server 430 that may host a website, social network, an internet database of information, or any other suitable online service. User equipment 402 may receive through communications network 414 information (e.g., in real-time or during predefined time intervals) from one or more online services hosted by web server 430. Examples of social networks include Facebook, MySpace, and Google+. Facebook is a trademark owned by Facebook Incorporated. MySpace is a trademark owned by Specific Media LLC. Google+ is a trademark owned by Google Incorporated. For example, content authorization information may be retrieved from an online service. The content authorization information may be used by control circuitry 304 determine access rights and permissions for a user. In some implementations, control circuitry 304 may query an online service associated with a given event by issuing a communication to web server 430. In particular, control circuitry 304 may query the online service for content authorization information associated with a given identified user. Control circuitry 304 may use the information received from the online service to determine whether a user is authorized to access a content asset.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the ABC, INC., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client component of the application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and BULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a tablet computer or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications or the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or, a user device can download content from multiple cloud resources for more efficient downloading. In some embodiments, user equipment devices can use cloud resources for processing operations such as the processing operations performed by processing circuitry described in relation to FIG. 3.

In some embodiments a media device may be capable of detecting and identifying users automatically. The device may log a detected and/or identified user into the device and utilize profiles and/or information associated with the user to track the number of authorized and unauthorized users detected within the predetermined proximity of a shared media equipment device. For example, control circuitry 304 of the shared media equipment device may retrieve content authorization information for each identified user, and determine the intersection of access rights of all identified users. For example, control circuitry 304 of the shared media equipment device may track account information for each detected and identified user, by storing a table of user profile information, user identification information, account numbers, account balances, content authorization information, or any other suitable user identification information. In response to receiving a user request to purchase an access right to view a content asset on the shared media equipment device, control circuitry 304 of the shared media equipment device may deduct a fee from the balance corresponding to the identified user.

A DRM system aggregates content authorization information for a group of users by analyzing the content authorization information belonging to each of the users and determining the intersection of content authorization information associated with all of the users of the group. Using the aggregated content authorization information, the system may enable a group of users to access a content asset on a shared media equipment device. For example, a group of patrons in a sports bar may want to view a live sporting event together on a television. The DRM system may identify the users that are within viewing proximity of the television and determine whether each of the users is authorized to view the sporting event. The DRM system may prompt unauthorized users to purchase an access right to view the sporting event, or request that the unauthorized users leave the area. If the DRM system determines that all the detected or identified users are authorized to access the content asset, it may enable access to the content asset on the shared media equipment device. Further embodiments and implementations of the disclosure will be described in reference to the figures and text that follow below.

DRM systems may be implemented on a media equipment device 300 as described above. In some embodiments, a DRM system may include a media guidance application. For example, a DRM system may be implemented as part of a media guidance application that may execute on control circuitry 304 of a shared media equipment device, such as media equipment device 300. The DRM system may be software that is stored on storage 308 and executed by processing circuitry 306. When executed by processing circuitry 306, the DRM system may instruct the processing circuitry to, for example, generate the various screens described below, direct display 312 to show the generated displays, transmit information on I/O path 302 or receive information from I/O path 302.

A personal user device may be any suitable user device that identifies a user or enables access to content assets, such as the devices described above in reference to FIG. 3 and FIG. 4. A personal user device is often a mobile or portable device, carried by a user, and may contain identification information for a user, and/or content authorization information for the user. A personal user device may be owned by a user or loaned to a user.

An identification device may be an RFID card, wireless RFID token, magnetic stripe card, or any other suitable identification device that may be used to detect or identify a user. The identification device may contain information about the identity of the user such as identity information, user profile information or content authorization information. For example, the identification device may contain an account number of the user with a digital access media distribution company.

In some embodiments, the personal user device or identification device may contain a globally unique personal identification number of the user. For example, the number may be a social security number. In some embodiments the identification device may be part of a limited set, and may contain an identification number that is unique within a limited set. For example, in a movie theatre, wireless ID tokens may be temporarily issued to each customer to identify the customer within the theatre.

A shared media equipment device may be any media equipment device, as described in above in FIG. 3 and FIG. 4, used by a group of users to access a content asset that the group of users is collectively authorized to access. The shared media equipment device may have a screen size large enough for each user of the group of users to share viewing of a content asset. A shared media equipment device may also be referred to as a shared device or a shared screen.

The term content authorization information may include any combination of identification information, a digital access right to a content asset, and/or permission information. The term content authorization information and license file may be used interchangeably. Identification information, such as user profile information, may identify a user in possession of the access rights. The digital access right may include metadata, an encryption key, hash code, date information, time information, identification numbers, digital water mark or other suitable information. Permissions may include parental controls or distributor restrictions.

Figure 5:
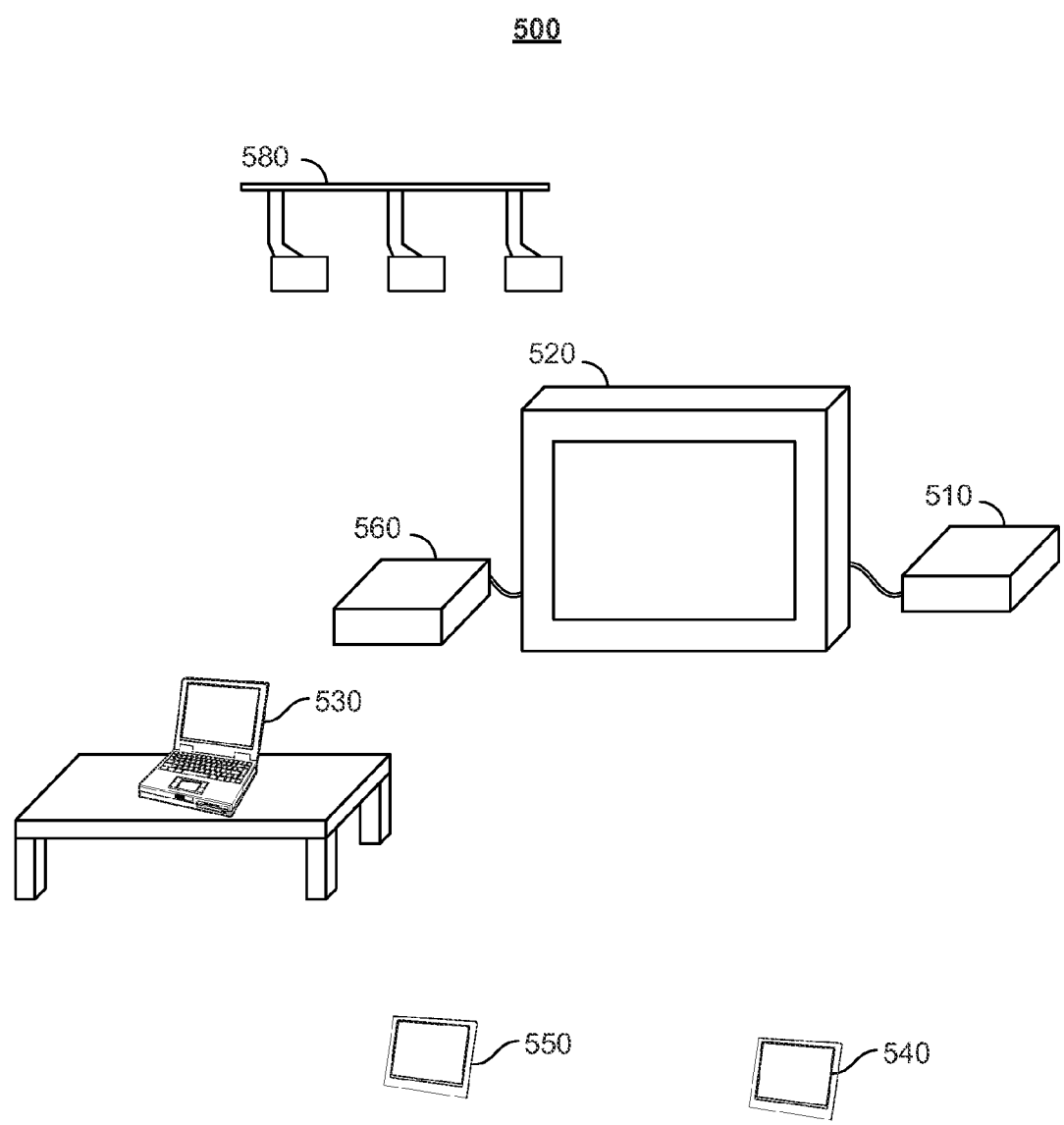
FIG. 5 illustrates examples of shared media equipment devices and personal user devices that may be used in accordance with some embodiments of the present disclosure.

FIG. 5 illustrates examples of personal devices and shared media equipment devices that may be used in accordance with some embodiments of the present disclosure. Media equipment devices may include set-top box 510, television equipment 520, laptop computer 530, table computer 540 and 550, speakers 580, tablet computers, smart phones, or any other suitable user devices or equipment, as described in FIG. 3 and FIG. 4. Personal devices may include laptop computer 530, tablet computer 540 and 550, tablet computers, smart phones, or any other suitable user devices or equipment, as described in FIG. 3 and FIG. 4.

Tablet computer 540 and tablet computer 550 may each belong to a different user. Each tablet computer 540 and 550 may contain user profile information and content authorization information of a corresponding user. The user profile information may enable identification of the user, and the content authorization information may describe the access rights or permissions associated with the user.

In some embodiments, content authorization information may be stored on a personal device such as a tablet computer or portable media player. The content authorization information of a user may correspond to a library of content assets stored on the PDA. In some embodiments, the content authorization information may not be stored locally on the tablet computer, but accessed from an online service 430 or online resource based on the user profile information.

Media equipment devices provide access to content and content assets. For example, a media equipment device may allow a user to view a broadcast program. Speakers 580 may provide audio for the program displayed on the media equipment device. The content asset may include visual components, audio components, any other suitable stimulus for perception of a content asset, or any combination thereof. For example, a content asset may be a movie which has an audio soundtrack and video. A content asset may have only an audio component such as a radio broadcast. A content asset may have only a video component such as a silent movie, or display of statistics. A content asset may include other stimuli such as tactile feedback. For example, viewers of a movie may experience vibrations on a portable handheld device such as a tablet computer or smart phone to accompany sound effects.

Set-top box 510 may be a device that implements a DRM system, and may be coupled to another shared media equipment device or personal user device. For example, set-top box 510 may be connected to a shared media equipment device, speakers 580, and a biometric device 560. In some embodiments, set-top box 510 and other shared media equipment devices may be incorporated into a single device. For example, a shared media equipment device may include any combination of a television, computer, speakers and a biometric device. The set-top box or shared media equipment device may have the ability to communicate with online resources or with personal user devices such as laptop 530, tablet computer 540 or 550.

As an example, a DRM system may include set-top box 510, shared media equipment device 520 and speakers 580. The set-top box 510 may identify users within a predetermined proximity of a shared media equipment device 520. Methods and systems for detecting users within a predetermined proximity of a media device have been described in detail in U.S. patent application Ser. No. 12/565,486, filed Sep. 23, 2009, which is hereby incorporated by reference herein in its entirety.

The predetermined proximity may be a physical proximity based on a perceivable range of the shared media equipment device. For example, the perceivable range may be related to a distance from shared media equipment device 520 within which a person may be able to view the display 312 of the shared media equipment device, or a distance from the speakers 580 within which a person may be able to hear the audio of a content asset.

The predetermined proximity may be determined based on the television display size, and the perceived display size as a function of distance from the display. In some implementations, geometric methods may be used to quantify the predetermined proximity. As an example, a user is able to more clearly see a television display at a distance of 1 meter from the display rather than at a distance of 10 meters from the display.

The predetermined proximity may be determined based on the volume of audio broadcast from the speaker 580. Sound intensity is inversely related to the squared distance from the source of the sound. Given a playback volume of the speakers 580 and a minimum audible threshold volume, it is possible to quantify a predetermined proximity from the shared media equipment device.

The predetermined proximity may be determined based on methods of detecting or identifying users. In some embodiments, a user may be associated with a personal device such as tablet computer 540 or 550. Such personal devices are often carried on the body of the user. By identifying and determining the location of the device, a system may determine the location of the user.

In some embodiments, the predetermined proximity may be based on a virtual proximity. As referred to herein, "virtual proximity" may refer to an active session of an online service, to which first and second user devices are connected. As referred to herein, the term "session" may refer to a temporary information interchange between two or more electronic devices connected via a communication path. The first user device and second user device may be logged into an online social network service or other multi-user online service, hosted on a web server or network of web servers. In such multi-user services, the first user device may log into a first account, the second user device may log into a second account, and the first and second accounts may be connected or coupled within the service.

A shared media equipment device may use a wireless transceiver to communicate with the personal device of a user to detect or identify the user. The wireless transceiver of the shared media equipment device may be able to determine distance of the personal device from the shared media equipment device based on the wireless signal strength of the personal device. In some embodiments, the predetermined proximity may be based on the detection range of the wireless system. For example, all devices detected with a signal strength above a minimum threshold may be designated within the predetermined proximity. In some embodiments, the predetermined proximity may be based on a perceivable distance described previously. The distance determined from a shared media equipment device by the wireless detection technique would be used to verify whether a user is within the predetermined proximity based on a perceivable distance.

A personal user device may not always be carried on the body of a user. For example, a user may physically pass a smart phone to a colleague to let the colleague use the phone. A user may also not own a portable electronic device or may turn off the wireless capabilities of the portable electronic device. Under such conditions, detection of the personal user device or lack thereof may not be sufficient to detect a user. A biometric device 560 may be used to detect or identify users. The biometric device 560 may be used jointly with wireless detection techniques or may be used independently without wireless detection techniques.

Biometric device 560 detects and identifies a user based on physical or behavioral traits using any suitable biometric recognition technique as described above in reference to detecting circuitry 307 of FIG. 3. Biometric device 560 may include detecting circuitry 307 as described in FIG. 3. Examples of methods used by a biometric device include face recognition, body recognition and voice recognition, as described above.

The geometry or shape of the predetermined proximity may be spherical, based on a radius from the shared media equipment device, or may be variable in shape. For example, a simple predetermined proximity may be a spherical region based on a fixed radius around the shared media equipment device. However, such a region may be overly inclusive. Television displays are typically unidirectional. Only users positioned in front of the display are able to view the content asset. Users positioned behind the display are unable to view the content asset. In addition, certain viewing positions relative to the television display may be more favorable than others. For example, a user positioned directly in front of a television display has a clearer view of the television screen than a viewer sitting to the far right of the television screen.

A biometric device, may include detecting circuitry 307 and associated hardware as described previously. In some implementations, a biometric device may include a camera, used to detect or identify users at specific positions relative to a shared media equipment device, and in particular a visual display such as television screen. In some embodiments, a biometric device may use wireless detection techniques to determine spatial location information about a personal device and accordingly a user corresponding to the personal device. For example, the 802.11N wireless protocol by the Institute for Electrical and Electronics Engineers (IEEE) includes provisions for detecting location of a device through the use of multiple antennas, and then forming a wireless beam to the device in order to improve communications. Wireless and biometric detection techniques may be used alone or in combination with any other suitable method to detect, identify or determine the location of users.

The shape and extent of the predetermined proximity may be dynamic and may vary with time. For example, depending on the volume of audio broadcast from the speakers 580, the predetermined proximity may be adjusted to encompass longer distances from the shared media equipment device when the volume is louder and shorter distances when the volume is quieter. Depending on the display size of shared media equipment device, the physical proximity may also be adjusted. The display size may be based on the physical size of the display screen, or may be based on the size of the content asset or a portion of the content asset shown in the display. For example, some sporting events may show a video that takes up only portion of a television display, while the remaining screen area is occupied by information about the sporting event. Predetermined proximity may be adjusted to encompass longer distances from the shared media equipment device when the display is larger and shorter distances when the display is smaller.

A DRM system may be implemented based on the shared media equipment devices and personal devices illustrated in FIG. 5. A first user and second user may want to watch a content asset such as a live pay-per-view sporting event on a shared media equipment device. The first user may possess a first personal user device 540, and the second user may possess a second personal user device 550. A menu may be displayed on any one of laptop 530, tablet computer 540 or 550, or a shared media equipment device that enables the user to request a program for viewing. Using the menu, one of the first or second users may request to view a content asset, such as the pay-per-view sporting event.

Set-top box 510, connected to shared media equipment device 520, may detect and identify the first and second users by wirelessly detecting personal devices 540 and 550 carried by each user. Upon identifying the first and second user, set-top box 510 may connect to an online service 430 to retrieve content authorization information associated with each of the users. The set-top box 510 may analyze the retrieved content authorization information to determine the intersection of access rights or permissions that are common to both the first and second user. Further details about the methods of analyzing the content authorization information will be discussed in reference to FIG. 6 below.

In some implementations, the first and second users may request to access a content asset before user detection and analysis of content authorization information by the shared media equipment device. In some implementations, the first and second users may request to access the content asset, such as the pay-per-view sporting event, after the shared media equipment device has automatically detected the first and second users, retrieved and analyzed the content authorization information corresponding to each of the users.

The set-top box 510 may then use the intersection of the access rights or permissions to determine whether both the first and second user are authorized to view the live sporting event. If both users are authorized to view the sporting event, then the first and second users are allowed to watch the sporting event on a shared media equipment device. If at least one user is unauthorized to view the sporting event, then the shared media equipment device may disable access to the content asset. For example, the shared media equipment device may stop displaying the content asset.

In some implementations, the content authorization information for the first user may be retrieved from personal user device 540, and content authorization information for the second user may be retrieved from personal user device 550. This mode of operation may be useful in an offline DRM system that does not have access to the internet.

In some implementations, a biometric device 560 may be used to detect and identify users, alone or in combination with the wireless detection technique. For example, set-top box 510 may receive input from biometric device 560 to verify that the first and second users are the only physical bodies present, to ensure there are no other unauthorized users present who may eavesdrop on viewing the content asset. The biometric device 560 may be used to detect or identify a third user who does not carry a personal device. For example, upon detecting or identifying the third user by using biometric device 560, the set-top box 510 may retrieve content authorization information for the third user, and analyze the intersection of the access rights or permissions of the third user relative to the access rights or permissions of the first and second user to determine whether the third user is authorized to view the sporting event. In response to detecting that the third user is authorized to view the content asset, the set-top box may allow the first, second and third users to watch the sporting event on shared media equipment device 520.

In some embodiments, in response to determining that a user is unauthorized to access a content asset, the DRM system may request that the unauthorized user purchase an access right to access the content asset. For example, in response to determining that the first user is not authorized to watch the sporting event, the DRM system may display a menu on personal device 540 requesting that the user order an access right through the menu, or leave the predetermined proximity of the shared media equipment device. If a user does not have a personal user device and has been detected by biometric device 560, the DRM system may display a message on shared media equipment device 520 requesting that the detected and unauthorized user purchase an access right. The DRM system may display the request message on a laptop computer 530 that is commonly accessible to all users, on a personal device of a user closest in physical location to the unauthorized user, or on a shared media equipment device.

In some embodiments, a DRM system may, based on the intersection of access rights or permissions of all detected users, display a list of content assets that are all commonly accessible. The users may then select one of the displayed content assets to view on a shared media equipment device such as shared media equipment device 520.

In some embodiments, a DRM system may detect a user entering a predetermined proximity of the shared media equipment device while a content asset is being shown to a group of users. In response to detecting the new user, the DRM system may identify the new user, retrieve content authorization information for the new user, analyze the retrieved content authorization information for the new user, and compare the access rights or permissions of the new user with the current group of users. If the new user is not authorized to view the content asset, the DRM system may display a message to the user requesting that the user purchase an access right to view the displayed content asset or leave the predetermined proximity region.

In some embodiments a DRM system may be implemented including a shared media equipment device, personal user device, and a remote web server 430. A first component of software implementing the DRM system may be executed by processing circuitry of the remote server, a second component of software implementing the DRM system may be executed by processing circuitry of the shared media equipment device and a third component of software implementing the DRM system may be executed by processing circuitry of a personal user device. In some implementations, control circuitry 304 of the personal user device may periodically determine first location coordinates of the personal user device and transmit the coordinates to remote web server 430. In some implementations, control circuitry of the shared media equipment device may periodically determine second location coordinates of the shared media equipment device and transmit information to the remote web server 430. In some implementations, control circuitry of the shared media equipment device may detect and identify users within the predetermined proximity and transmit information about the identified and unidentified users to remote web server 430. In some implementations, control circuitry 304 of remote web server 430 may receive the first and second location coordinates from the personal user device and shared media equipment device, respectively, and determine whether the personal user device and corresponding user are located within a predetermined proximity of the shared media equipment device. In some implementations, control circuitry 304 remote web server may receive the identities of users detected within a predetermined proximity of the shared media equipment device.

In response to determining that a user is within the predetermined proximity of the shared media equipment device, control circuitry 304 of the web server 430 may retrieve content authorization information associated with the user determine whether the user is authorized to view a content asset that may be accessed by the shared media equipment device. In response to determining that the user is not authorized to access the content asset, control circuitry of the web server may transmit information to the personal user device corresponding to the user to display screen 900 to the user on the personal user device, and control circuitry of the web server may transmit information to the shared media equipment device to show screen 800 on a display of the shared media equipment device.

In some embodiments, control circuitry 304 may determine that more than one user, for example a first and second users, may be detected within the predetermined proximity of the shared media equipment device. In response, control circuitry 304 of the remote web server 430 may retrieve first and second content authorization information associated with the first and second users, respectively, and analyze the intersection of access rights of the content authorization information.

Figure 6:
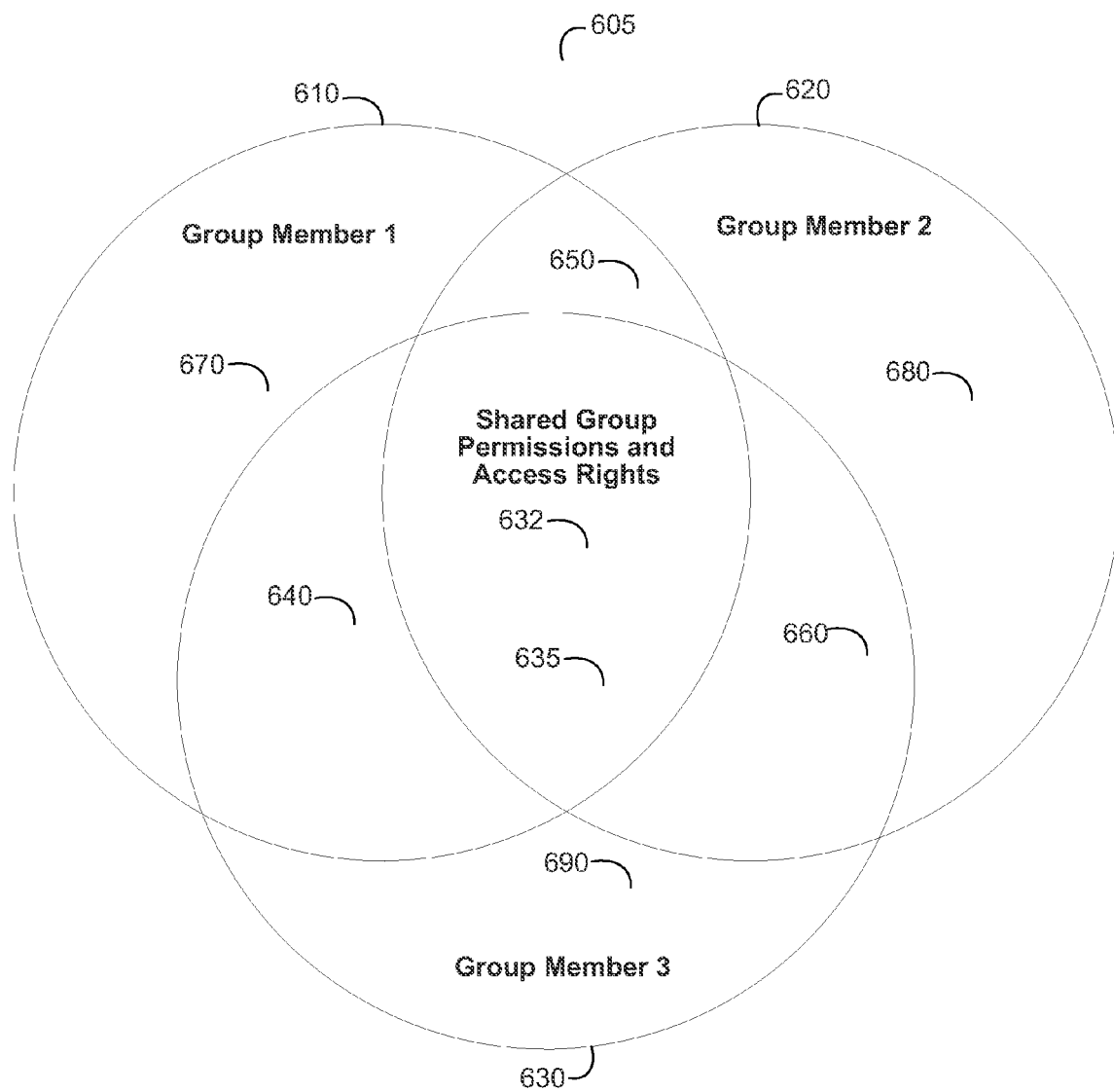
FIG. 6 illustrates a diagram 600 showing an intersection of access rights and permissions that may be determined from content authorization information of each user of a group of users.

FIG. 6 illustrates a diagram 600 that visualizes the intersection of access rights or permissions that may be determined from content authorization information for each user of a group of users. Each user has corresponding content authorization information that describes the access rights granted to the user or permissions assigned to the user. The content authorization information may include user identification (ID) information, service subscription information and digital access right information for a content asset. The content authorization information will be explained further below in reference to FIG. 10.

An access right may correspond to a content asset, content, multimedia, or any combination thereof. As an example of a single content asset, an access right may correspond to a single episode of a television show, a movie, or a music file. As an example of content, an access right may correspond to a subscription broadcast sports channel. As an example of a combination, an access right may correspond to a subscription broadcast sports channel in addition to specific recorded sports programs available on-demand.

Diagram 600 includes three circles, each of which represents content authorization information, including access rights or permissions, associated with each of three different users. Circle 610 represents access rights or permissions associated with user 1; circle 620 represents access rights or permissions associated with user 2; circle 630 represents access rights or permissions associated with user 3.

Non-overlapping regions within diagram 600 indicate access rights or permissions that are exclusively associated with a user. Region 670 indicates access rights or permissions that are associated only with user 1. Region 680 indicates access rights or permissions that are associated only with user 2. Region 690 indicates access rights or permissions that are only associated with user 3. Regions outside the circle correspond to content assets and content that none of the users is authorized to access.

The overlapping regions indicate intersections of the access rights or permissions that are commonly associated with users represented in the overlap region. Region 635 represents the intersection of access rights or permissions associated with user 1, user 2 and user 3. Region 640 indicates access rights associated with user 1 and user 3, but not user 2. Region 650 indicates access rights or permissions associated with user 1 and user 2 but not user 3. Region 660 indicates access rights or permissions associated with user 2 and user 3, but not user 1.

Relative size of each overlap region and non-overlap region may indicate the relative number of access rights or permissions that may be shared. For example, larger overlap regions may indicate more access rights or permissions that may be shared by the users, and the smaller overlap regions may indicate fewer access rights or permissions that may be shared by the users. If the three users shared the same content authorization information, then FIG. 6 would show a single circle. If the three users did not share any common content authorization information, then FIG. 6 would show three separate circles.

In some embodiments, a DRM system may analyze content authorization information retrieved for a group of identified users, and show the results of the analysis using FIG. 6. For example, processing circuitry 306 may retrieve metadata corresponding to each access right of content authorization information associated with each of the users. Processing circuitry 306 may compare the metadata of the access rights of the users and determine if there are any matches. Processing circuitry 306 may group the access rights as a function of the matches into any of regions 605-690 as described above. For example, if an access right is found in the content authorization information of all three users, it may be assigned to a group corresponding to region 635 of FIG. 6. If an access right is found in the content authorization information of only user 1 and user 2, but not user 3, it may be assigned to a group corresponding to region 635.

In some embodiments, a circle may be used to represent a user. The relative sizes of the circles may indicate the relative numbers of access rights associated with users. For example, processing circuitry 306 may count the number of access rights associated with a user, and display a circle with a radius proportional to the number of access rights associated with a user. In some embodiments, the size of an overlap region may correspond with the number of access rights associated with the region. For example, processing circuitry 306 may determine the number of access rights that are shared by two users. Processing circuitry 306 may display two circles, each sized according to the number of content assets associated with the user. Processing circuitry may display an overlap region of the two users, sized according to the number of shared access rights. In the case of multiple users, multiple overlap regions may be sized according to the number of access rights. It should be understood that in some embodiments other shapes may be used instead of circles. In some embodiments, in addition or aside from number of access rights or permissions, the regions may correspond to content assets or content associated with access rights and permissions. For example, processing circuitry 306 may adjust the size of the regions based on the number of content assets associated with access rights and permissions in that region.

In some embodiments, a shared media equipment device used in a DRM system may display a list of content assets and content corresponding to the content authorization information of the users. For example, processing circuitry 306 of the shared media equipment device may group listings of content assets and content by the regions indicated in FIG. 6, regions 605-690. Within each group, listings may be ranked by preference information that may be included in user profile information or content authorization information.

The different groups of listings may be ranked by the number of users that are authorized to access the listings. For example, the group of listings that can be accessed by all three users may collectively rank higher than groups of listings that can only be accessed by two users, or by one user. The different groups of listings may then be ranked by relative size of the groups. For example, processing circuitry 306 may count the number of listings in each group, and order the groups of listings by size of the groups. Within each group, listings may be ranked by user preference information. For example, processing circuitry 306 may rank content assets or content corresponding to access rights or content authorization information associated with a group of users by using user preference information from the users.

In some embodiments, control circuitry 304 of a shared media equipment device may store content assets that may be accessed by users. For example, three users may wish to select a movie for viewing from a shared media equipment device which has a library of content assets. In such a case, there may be content assets stored on the shared equipment device that none of the users is authorized to access. These content assets, which are not associated with a user, may be displayed in region 605 of FIG. 6. For example, control circuitry 304 of the shared media equipment device may identify the three users, and retrieve the content authorization for each of the users. Control circuitry 304 may then determine the intersection of the access rights and permissions of the content authorization information of the three users and the content assets stored on the shared media equipment device. Control circuitry 304 may determine that there are content assets stored on the shared media equipment device that none of the users is authorized to access. In response, control circuitry 304 of the shared media equipment device may direct display 312 to show the content assets that are inaccessible to any of the users as the region outside the three circles representing the three users in FIG. 6. In some implementations, content assets inaccessible to any of the users may be represented by discrete dots in FIG. 6.

When a user requests to access a content asset, a DRM system may determine whether any of the users are authorized to access the content asset, by comparing against the analyzed content information. For example, processing circuitry 306 of the DRM system may classify the content asset as belonging to one of regions 605-690 as described above. Processing circuitry 306 may compare metadata of the requested content asset with the metadata of each access right of each group of access rights shown in FIG. 6. Processing circuitry 306 of the DRM system may then determine whether any user of the group is unauthorized to access the content asset. For example, if the content asset is assigned to a display region other than region 635, then at least one user is unauthorized to access the content asset. In response to determining that at least one user is unauthorized to access the content asset, processing circuitry 306 may identify the at least one user and prompt the at least one user to either purchase an access right, or leave the predetermined proximity of a shared media equipment device.

In some embodiments, FIG. 6 may be displayed as a graphical user interface to select a content asset for viewing. For example, processing circuitry 306 of the shared media device may compute the size and overlap of the circles for each detected user as described above, and direct display 312 to display the resulting figure. Processing circuitry 306 may display a cursor that may be used to select locations on the display of the FIG. 6. In response to receiving a user command to position a cursor over a selectable region, processing circuitry 306 may display media guidance data for the content asset corresponding to the selectable region.

Each selectable location may correspond to a content asset that has been determined to be accessible by none of the users, or by at least one of the users. For example, a selectable location may correspond to a content asset stored by the shared media equipment device that none of the identified users is authorized to access. For example, a selectable location may correspond to a content asset corresponding to an access right that is included in the content authorization information associated with one or more of the identified users.

Processing circuitry 306 may organize the selectable locations by user preference information in a radial direction, or any other suitable orientation. For example, with reference to FIG. 6, a center point 632 may be observed within region 635. Processing circuitry 306 may position selectable regions corresponding to content assets along a radial or polar direction from the center point according to rank by preferences for users within a particular region at a greater distance away from the center point 632.

For example, within region 670, corresponding only to user 1, processing circuitry 306 may position selectable regions along a radial direction according to ranking by preferences of user 1. Processing circuitry 306 may position selectable regions corresponding to lower ranked content assets further away from the center point, and position selectable regions corresponding to higher ranked content assets closer to the center.

For example, within region 640, corresponding to user 1 and user 3, content assets corresponding to access rights may be ranked as a weighted function of preference information of both user 1 and user 3. Processing circuitry may position selectable regions corresponding to higher ranked content assets at a radial position closer to the center point, and may position selectable regions corresponding to lower ranked content assets at a radial position farther from the center point. Processing circuitry 306 may place selectable regions corresponding to similarly ranked content assets at a polar position closer to the center point for region 610 corresponding to user 1, or closer to the center point of region 690 corresponding to user 3, depending on whether the content asset is more highly ranked by the preferences of user 1, or user 3.

In some embodiments, each circle may correspond to a digital locker associated with a user. As referred to herein, the term "digital locker" may be understood to refer to a data storage for the user, of guidance data, user profile information, and content assets and/or content authorization information for content assets that are possessed by the user. The "digital lockers" maybe stored in part or whole on any suitable storage such as web server 430, content source 416, or guidance data source 418. The diagram 600 may be used to visualize the content assets and access rights of digital lockers of various users.

As described above, user 1 and user 2 may possess an access right to a content asset that user 3 is not authorized to access, and such a content asset may be located in region 650 of diagram 600. In some embodiments, user 1 and user 2 may wish to share a temporary access right to the content asset with user 3, to enable all three users to watch the content asset together on a shared media equipment device. For example, a selectable location corresponding to the content asset may be dragged from region 650 to region 635. In response to receiving a user input indicating that a temporary access right to a content asset may be assigned to a user, control circuitry 304 of a shared media equipment device may generate a temporary access right for the content asset, and update content authorization information associated with user 3 to include the temporary access right.

For example, control circuitry 304 of the shared media equipment device may retrieve content authorization information associated with user 3 from a personal user device corresponding to user 3, or from a web server, remote server, content source, or any other suitable storage. In some implementations, control circuitry 304 may update the retrieved content authorization information associated with user 3 to include the temporary access right, and transmit the updated content authorization information back to the storage from which it was retrieved. In some implementations, control circuitry 304 may transmit the temporary access right to the storage that includes content authorization information associated with user 3, in order to authorize user 3 to access the content asset. The temporary assignment and exchange of digital access rights is described in greater detail in U.S. patent application Ser. No. 13,341,546, filed Dec. 30, 2011, which is hereby incorporated by reference herein in its entirety.

In some embodiments, the display screen 600 of FIG. 6 may indicate the content assets that a group of users detected within a predetermined physical proximity of a shared media equipment device or within a virtual proximity may be collectively authorized to access. As described above, a DRM system may analyze content authorization information retrieved for a group of detected and identified users and generate the display screen 600 of FIG. 6. For example, control circuitry 304 of the shared media equipment device may identify three users, and retrieve the content authorization for each of the users. Control circuitry 304 may then determine the union of the access rights and permissions of the content authorization information of the three users, and generate the display screen 600 which includes content assets corresponding to the union of access rights and permissions. The DRM system may enable the group of users to collectively access any of the content assets indicated in the generated screen 600, as long as at least one user who possesses an access right to access a content asset is detected within a predetermined proximity or virtual proximity. For example, control circuitry of a shared media equipment device may receive a user selection of a content asset indicated in display screen 600 from region 690 corresponding to access rights that are possessed by user 3, but not user 1 and user 2. Control circuitry of the shared media equipment device may detect that user 1, user 2 and user 3 are within a predetermined proximity of the shared media equipment device and enable access to the selected content asset, even though user 1 and user 2 may not possess the access right.

In some implementations, control circuitry of the shared media equipment device may maintain access to a selected content asset for a predetermined time after a user possessing the access right to the content asset leaves a predetermined proximity of the shared media equipment device. For example, while playing back a content asset, for which only user 3 possesses an access right, control circuitry of the shared media equipment device may determine that user 3 or a personal user device corresponding to user 3 is no longer detected within a predetermined proximity. The control circuitry of the shared media equipment device may maintain access to the content asset until the predetermined time elapses. The predetermined time may be a duration or time specified by a user, a play back length of a content asset, or a duration required to complete play back of a content asset.

In some implementations, control circuitry of a shared media equipment device may generate temporary access rights to enable a group of users to access a content asset, for which one of the group of users may possess an access right. For example, control circuitry of a shared media equipment device may receive a request to access a content asset indicated in region 690, which may correspond to content assets for which user 3 possesses access rights, but for which user 1 and user 2 do not possess access rights. Control circuitry of the shared media equipment device may generate a temporary access right for the content asset based on an access right possessed by user 3. The control circuitry may update content authorization information associated with user 1 and user 2 to include the temporary access right, to enable user 1 and user 2 to access the requested content asset. It should be understood that above described embodiments and implementations may also apply to shared access based on a virtual proximity. For example, multiple users may be logged into an online service such as a social network from a personal user device. Control circuitry of a web server 430 hosting the social network may detect that multiple users are logged into a session on the social network from multiple personal user devices. The control circuitry of the web server may retrieve content authorization associated with each user logged into the session, generate a display screen 600 and transmit information about the display screen to the personal user devices. In response to receiving a request from a personal user device to access a content asset indicated in the display screen 600, the control circuitry of the web server may enable access to the content asset on the personal user devices, while the users are detected within a virtual proximity.

Figure 7:
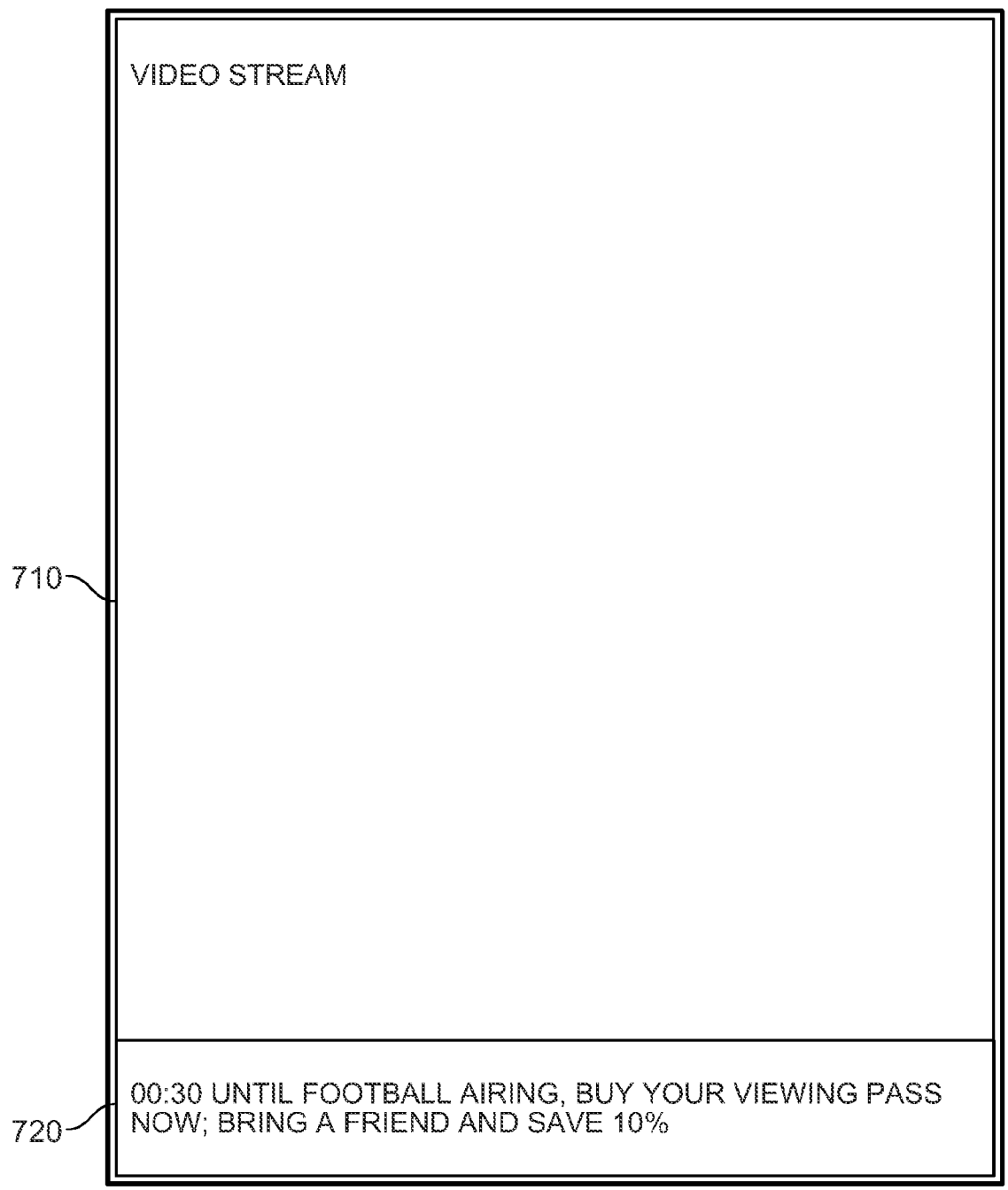
FIG. 7 illustrates a screen 700 that may be displayed on a shared media equipment device used to access a content asset in accordance with some embodiments of the present disclosure.

FIG. 7 illustrates a screen 700 that may be displayed on a shared media equipment device used to access a content asset in accordance with some embodiments of the present disclosure. The screen may include a video display region 710 and message display region 720.

A DRM system may include shared media equipment device 402, which may include a biometric device 560, and user equipment 403, which may include laptop computer 530. The DRM system may be placed inside a public venue such as a sports bar to enable the viewing of live sporting events. In some embodiments, processing circuitry 306 of a shared media equipment device, such as television equipment 402, may display screen 700.

For example, a live sporting event scheduled to commence in the near future may be available for broadcast. Prior to the start of the broadcast, a shared media equipment device may receive pre-game video content and status updates from content source 416. For example, processing circuitry 306 in a shared media equipment device 402 may receive a video stream and information about the upcoming broadcast from I/O path 302. The video stream and information may be transmitted by content source 416 or web server 430 across communications network 414, and received from communication path 408, by shared media equipment device.

The received video stream and information may be displayed on display 312 of shared media equipment device. For example, processing circuitry 306 may direct display 312 to show the video stream in region 710 and the information in region 720. Region 710 of screen 700 may show advertisements and pre-game highlights. Region 720 may display information about the upcoming game, and information about purchasing an access right to view the game. As illustrated in FIG. 7, a message may be displayed indicating the time remaining before start of the broadcast of the game, and promotional offers on the purchase of access rights. Through the process described above, shared media equipment device 402 may receive periodic updates from content source 416.

In some embodiments, processing circuitry 306 of a personal user device may show display screen 700 of FIG. 7, in response to the user and personal user device entering a predetermined proximity of a shared media equipment device. For example, shared media equipment device may detect that a personal user device 406 has entered a predetermined proximity around shared media equipment device 402. Detecting circuitry of shared media equipment device 402 may detect personal user device 406 using wireless detection techniques as described previously, and detect and identify the user in possession of personal user device 406 using biometric detection techniques, wireless detection techniques, or a combination thereof as mentioned previously. In response to detecting and identifying the user, detecting circuitry 307 inside television 406 may signal to processing circuitry 306 that a user with a personal user device has been detected. The processing circuitry of the shared media equipment device may transmit the video stream and information to I/O path 302 for delivery across communications path 408 via communications network 414 and communication path 412 to personal user device 406.

Processing circuitry of personal user device 406 may receive the video stream and information from an I/O path, and direct display 312 of the personal user device 406 to show the video stream in region 710 and information in region 720 of screen 700. The display screens shown on a personal user device may include other variations that will be discussed further below in reference to FIG. 9.

A DRM system may enable copyright owners to implement a variety of pricing schemes for selling access rights for content and content assets. In some embodiments, the copyright owner may charge a fixed fee to access the live broadcast of the sporting event to the shared media equipment device 402 in the sports bar. The copyright owner may charge the fixed fee assuming that a certain number of viewers will attend to view the sporting event.

Previously, the sports bar owner, acting as a distributor, would need to absorb the total upfront cost of purchasing the access right to show the live sporting event in the bar. The cost of purchasing the access right may be recouped by sales of drinks and services to patrons who come to the sports bar to view the sporting event.

Using the proposed DRM system, the cost of the access right may be shared by the sports bar owner with the viewers of the sporting event, or distributed entirely among the users. The sports bar owner may set up program pricing algorithms into the DRM system. For example, a fixed per viewer fee may be initially charged to viewers of the sporting event. There will be a critical number of viewers needed to recoup the fixed cost of the access right. When the number of paying viewers exceeds this critical number, the fee charged to each user will be reduced, as the total fixed cost may be divided evenly among each viewer. The viewers who had initially paid in excess of the reduced fee will be reimbursed by an appropriate amount.

In some implementations, the sporting event may not be accessed if there is not a critical number of paying viewers. For example, the sports bar owner may decide to refund the fixed cost of the access right, or not order an access right to the broadcast of the sporting event at all.

In an illustrative example, the fixed fee to access the live sports broadcast may be $100.00. The initial fee charged to viewers may be $10.00. Therefore, a minimum of 10 viewers paying the $10.00 fee is required to recoup the cost of the access right. If an additional 10 viewers pay to view the broadcast, there will be a total of 20 viewers. Accordingly, each of the 20 viewers will assessed a $5.00 fee, equal to the $100.00 fixed fee divided among the 20 viewers. The initial viewers will each be reimbursed an amount of $5.00.

For example, an operator may program a shared media equipment device of the DRM system to operate in fixed mode. Processing circuitry 306 of a shared media equipment device may receive the programmed instructions entered by an operator from user input interface 310. Processing circuitry 306 may store the fixed fee of $100.00, the initial viewer fee of $10.00, an initial count of 0 authorized viewers, a threshold count of 10 authorized viewers, and a count of unauthorized viewers in storage 308. Next detecting circuitry 307 may detect and identify a personal user device 406 and a viewer corresponding to the personal user device 406. Detecting circuitry 307 may indicate to processing circuitry 306 that a user has been detected. Upon receiving the identity of the user, processing circuitry 306 may retrieve content authorization information corresponding to the user from either the personal user device or from the internet.

Processing circuitry 306 of the shared media equipment device may determine, based on the identity of the user, whether the user is authorized to view the sports broadcast. If the user is authorized to view the sports broadcast, processing circuitry 306 may increment the count of authorized users. If the user is not authorized to view the sports broadcast, the shared media equipment device may display a prompt requesting that the user purchase an authorization right. For example, the processing circuitry 306 of the shared media equipment device may direct display 312 to show a prompt screen to the user. For example, the processing circuitry of the shared media equipment device may transmit instructions to a personal user device 406 corresponding to the user, to display a screen 900 illustrated in FIG. 9. The transactions with a user to purchase access rights will be further discussed below in reference to FIG. 9.

In response to receiving a purchase request from the user to purchase an access right to a content asset, processing circuitry 306 of the shared media equipment device may increment the count of authorized users in storage 308, and also update the content authorization information of the user. For example, if the content authorization information is stored on an online service 430, processing circuitry 306 of the shared media equipment device may transmit a message to online service 430 requesting that the content authorization information of the user be updated to include an access right and/or permission to access the content asset. If the content authorization information is stored on the personal user device, processing circuitry 306 of the shared media equipment device may transmit a message to the portable user device requesting that the content authorization information for the respective user be updated to include an access right and/or permission to access the content asset.

When detecting circuitry 307 detects a user leaving a predetermined proximity of the shared media equipment device, it may send a signal to processing circuitry 306. In response to receiving the signal, processing circuitry 306 may decrement a count of authorized users, if an authorized user is detected leaving the predetermined proximity, or decrement a count of unauthorized users, if an unauthorized user is detected leaving the predetermined proximity.

If processing circuitry 306 determines that the number of authorized users exceeds the critical threshold, then processing circuitry 306 may calculate a discounted viewer fee and refund amount for each authorized user. Processing circuitry 306 may calculate the discounted viewer fee as the total fixed fee divided by the number of authorized users. The refund amount for each authorized user may be the difference between the initial viewer fee and the discounted viewer fee. Processing circuitry 306 may then credit the refund amount to an account of each authorized viewer.

In response to determining that the number of authorized users exceeds the critical threshold, and detecting an unauthorized user entering the predetermined proximity of the shared media equipment device, processing circuitry 306 may calculate a discounted viewer fee to charge the detected unauthorized user, that may be calculated to include the unauthorized user. For example, if the critical number of users is 10, the number of authorized viewers is 19, and processing circuitry 306 detects an unauthorized user, processing circuitry 306 calculate a discounted viewer fee by dividing the total fixed fee of $100 by the count of the authorized users and authorized users, 20, to result in a discounted viewer fee of $5.00 that would be charged to the unauthorized viewer.

In some embodiments, the copyright owner may set a per-viewer fee arrangement, rather than a fixed fee arrangement. Under this fee arrangement, each viewer is charged a nominal fee to obtain an access right to view the broadcast of a content asset. In the example of the live sporting event broadcast, the copyright owner may decide to charge each viewer $5.00 to access the sporting event. A distributor may charge commission on top of the base fee charged by the copyright owner. For example, the owner of the sports bar may charge a $1.00 commission on top of the $5.00 fee charged by the copyright owner. Accordingly, the total fee charged to the user would be $6.00.

For example, processing circuitry 306 receive a command to operate in fixed viewer fee mode. It may store a copyright owner fee of $5.00, and a distributor commission fee of $1.00 in storage 308. In response to receiving an indication from detecting circuitry 307 that an unauthorized user has entered the predetermined proximity of the shared media equipment device, processing circuitry 306 may display a message indicating that displays the fixed viewer fee that may be paid to purchase an access right to access a content asset.

In some implementations, viewers may be offered explicit incentives to encourage other users to purchase an access right. In the example of the live sporting event broadcast, a viewer who brings a friend to view the broadcast may be offered a ten percent discount. The tracking of relationships between users may be done through user-referral codes. For example, when a first viewer purchases an access right to view the sporting event, the first viewer may be provided with a list of five user-referral codes assigned to the first viewer. The user-referral code may be a string of five random characters. The first viewer may provide a second viewer, the friend, with the referral code to include with a purchase order for an access right.

For example, processing circuitry 306 of shared media equipment device 402 may receive purchase orders from a first viewer. Processing circuitry 306 may assign the set of user-referral codes to the first viewer, store the codes in storage 308, and transmit the user-referral codes to the first viewer, for example by transmitting the codes to a personal user device that corresponds to the first viewer. The second viewer may send a purchase order including one of the user-referral codes of the first viewer from a personal user device corresponding to the second viewer. Processing circuitry 306 of the shared media equipment device may receive the purchase order from the second viewer, determine whether there is a user-referral code. In response to determining that there is a user-referral code, processing circuitry 306 may extract the user-referral code and query storage 308 to determine if there is a user corresponding to the code. In response to determining that there is a corresponding user, processing circuitry 306 may discount the fee charged to the user. For example, processing circuitry may refund the discounted amount to an account of the corresponding user, the first viewer.

In some embodiments, diagram 600 may be displayed in screen 700 as an overlay or window in the video display region 710. For example, processing circuitry 306 of the shared media equipment device may generate and direct display 312 to show diagram 600. Display of the diagram 600 enables users to visualize the number of viewers who are authorized to view a selected content asset. Processing circuitry 306 may generate a number of circles equal to the number of detected users within the predetermined proximity of the shared media equipment device. A selected content asset for display may be shown as a point in one of the regions described in FIG. 6. For example, if processing circuitry 306 determines that none of the detected users is authorized to access the selected content asset, such as a live broadcast of a sporting event, then processing circuitry 306 may generate and display the diagram 600 with a number of circles corresponding to the number of detected users, and a region outside all of the circles corresponding to the content asset that none of the users is authorized to view. As users are granted authorization to view the content asset, the region corresponding to the content asset will appear inside the corresponding circular regions corresponding to the authorized users.

In some embodiments, the shared media equipment device may display FIG. 7, prior to accessing and displaying a content asset. For example, before accessing the content asset, processing circuitry 306 of the shared media equipment device may retrieve content authorization information associated with each user that has been detected and identified by detecting circuitry 307. Processing circuitry 306 may extract access rights from each retrieved content authorization information, and then retrieve metadata associated with each extracted access right. Processing circuitry 306 may then compare the associated metadata with the metadata associated with the content asset listed in region 720 that may be accessed by the shared media equipment device. This analysis determines which of the detected and identified users is authorized to access the content asset.

In some implementations, the identity of unauthorized viewers may be displayed in region 830 of screen 800. For example, processing circuitry 306 of a shared media equipment device may direct display 312 to show a list of user names. In some implementations, photographs corresponding to each authorized and unauthorized users may be displayed. The photographs may be displayed on the shared media equipment device or on a personal user device such as a tablet computer. In the example of the sports bar and sporting event, the owner of the sports bar may use the photographs of the authorized and unauthorized viewers to visually identify a user. This enables the sports bar owner to personally request unauthorized viewers to leave the predetermined proximity of the shared media equipment device, or to offer rewards such as complimentary drinks to the authorized viewers.

The above analysis of determining and identifying authorized and unauthorized users enables a viewer and/or a distributor to determine how many viewers are authorized to view the content asset described in FIG. 7. Based on this information, an unauthorized viewer may determine whether to purchase an access right, and a distributor may decide which type of pricing scheme to user. For example, in response to directing a display 312 to show screen 700 of FIG. 7, control circuitry 304 of a personal user device may receive a user input from user input interface 310 indicating that user does not wish to purchase an access right. In the example of the sports bar and live sporting event, a distributor such as the sports bar owner, may decide to use a fixed fee pricing scheme if the number of authorized viewers is close to the critical threshold count of viewers to recoup the cost of the fixed fee, as described above. For example, processing circuitry 306 of a shared media equipment device may receive user input from a distributor to program instructions into storage 308. The instructions may include a conditional expression instructing processing circuitry 306 to transmit an message to a content source 416 or web server 430 to cancel payment of the previously described fixed fee for an access right to a content asset if a number of identified users within the predetermined proximity of the shared media equipment device, having purchased an access right to the content asset, does not exceed the previously described critical threshold. The sports bar owner may also decide to cancel the access and showing of the sporting event if the number of authorized viewers is far below the critical threshold count to pay for the fixed fee of the access right.

Figure 8:
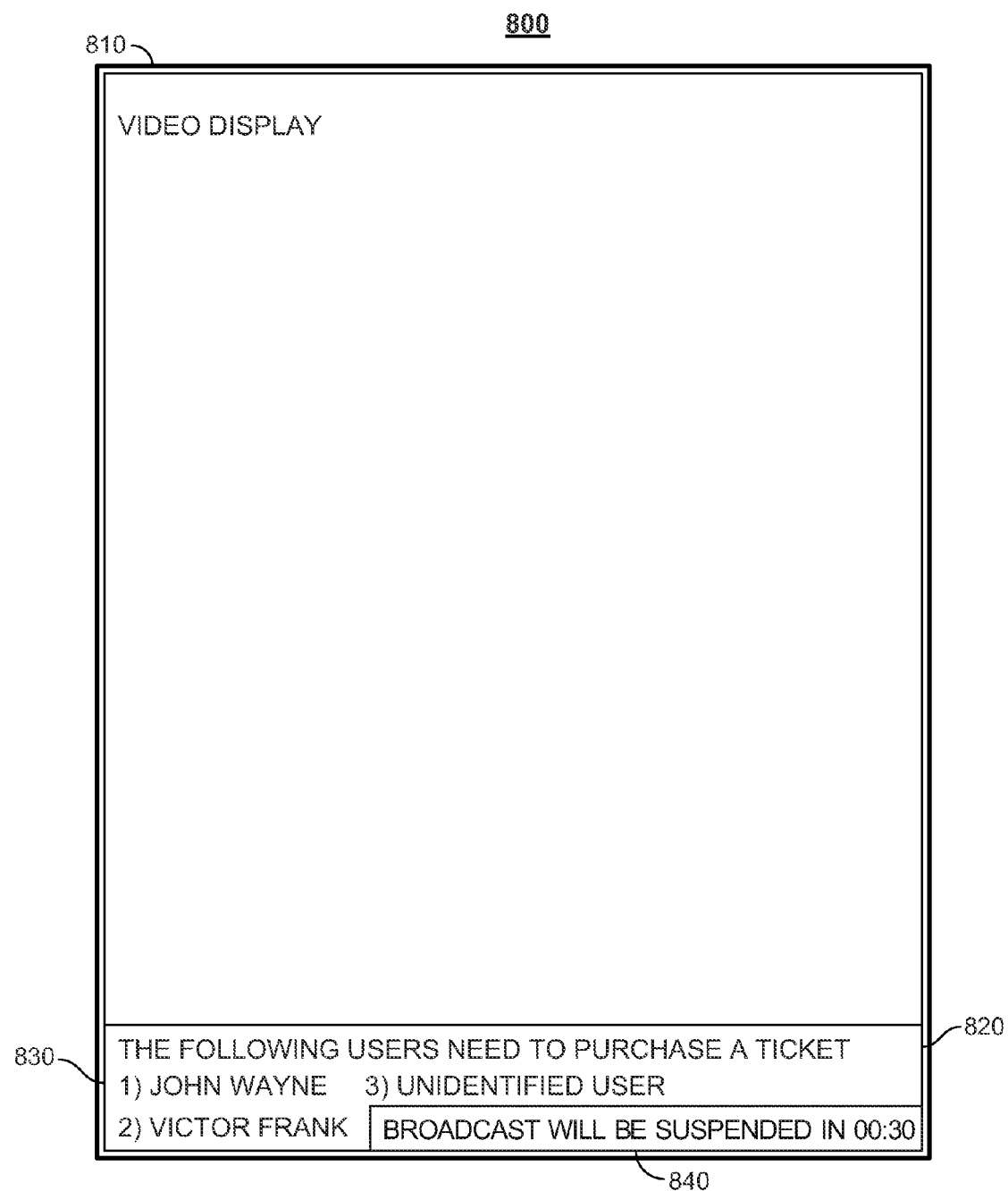
FIG. 8 illustrates a screen 800 that may be displayed on a shared media equipment device displaying messages in accordance with some embodiments of the present disclosure.

FIG. 8 illustrates a screen 800 that may be displayed on a shared media equipment device displaying messages in accordance with some embodiments of the present disclosure. Screen 800 includes video display region 810, and message display region 820. The message display region 820 may include a main message 830, and warning message 840. Screen 800 may be shown during display of a content asset when unauthorized users are detected entering the predetermined proximity of a shared media equipment device. Video display region 810 may show a content asset that a number of media users are authorized to view. Message display region 820 may show information about unauthorized users and consequences unless the unauthorized users purchase an access right or leave the predetermined proximity.

As an example, a live sporting event may be currently shown on shared media equipment device 402 in a sports bar. A user may enter a predetermined proximity to the shared media equipment device to view the sporting event. The shared media equipment device may detect the unauthorized user, and in response show screen 800. For example, processing circuitry 306 may receive a signal from detecting circuitry 307 indicating that the new user has been detected and identified. Processing circuitry 306 may retrieve content authorization information for the user and determine whether the user is authorized to view the currently broadcast content asset. In response to determining that the user is not authorized to view the currently broadcast content asset, processing circuitry 306 may direct display 312 to show screen 800. Processing circuitry 306 may direct display 312 to show the identity of unauthorized user, or in the event that the user is unidentified, indicated that an unauthorized user is within the predetermined proximity. Processing circuitry 306 may direct display 312 to show a message requesting that the unauthorized user purchase an access right or leave the predetermined proximity.

In some implementations, a penalty may be enforced if the unauthorized user does not purchase an access right or leave the predetermined viewing area within a predetermined time. A penalty may include suspension of the video broadcast, suspension of the audio broadcast, a fee charged to authorized viewers, any other suitable penalty or any combination thereof. The display of the identity of the offending unauthorized user and the penalty are intended to help enforce access rights and limit viewing of the broadcast content asset to the authorized users that have paid for the content asset. The public display of the offending identity and group penalty may encourage group enforcement of the access rights by the group of authorized users to exclude a disruptive offender who wants to access a content asset without any intention of purchasing an access right.

For example, as illustrated in FIG. 8, main message 830 identifies three unauthorized viewers. A warning message 840 indicates that the broadcast will be suspended in 30 minutes unless the unauthorized viewers purchase an access right, or leave the predetermined proximity of the shared media equipment device 402.

For example, processing circuitry 306 of shared media equipment device 402 may receive an indication from detecting circuitry 307 that a new user has been detected and identified. Processing circuitry 306 may retrieve content authorization for the identified user. In response to determining that the user is not authorized to access a currently broadcast content asset, processing circuitry 306 may start a timer count down from a preset time, and direct display 312 to show the identity of the unauthorized user and display a penalty. If processing circuitry 306 does not receive a purchase order for access right from the unauthorized user before the timer expires, processing circuitry 306 may direct the display 312 to mask the broadcast of the content asset and direct speakers 314 to mute volume.

In some embodiments, diagram 600 may be displayed in screen 800 as an overlay or window in the video display region 810. For example, in response to detecting an unauthorized user entering the predetermined proximity of a shared media equipment device, processing circuitry 306 of the shared media equipment device may generate and direct display 312 to show diagram 600. Display of the diagram 600 enables users to visualize the number of detected viewers who are unauthorized to view a selected content asset. Processing circuitry 306 may generate and display diagram 600 with an additional circular region that excludes a region corresponding to the selected content asset. The additional circular region may overlap the circular region of another user, if there are common access rights shared with the other user, exclusive of the selected content asset. If the unauthorized user is granted authorization to view the content asset, processing circuitry 306 may modify diagram 600 by moving the circular region corresponding to the newly authorized user such that it encloses the region corresponding to the selected content asset.

Figure 9:
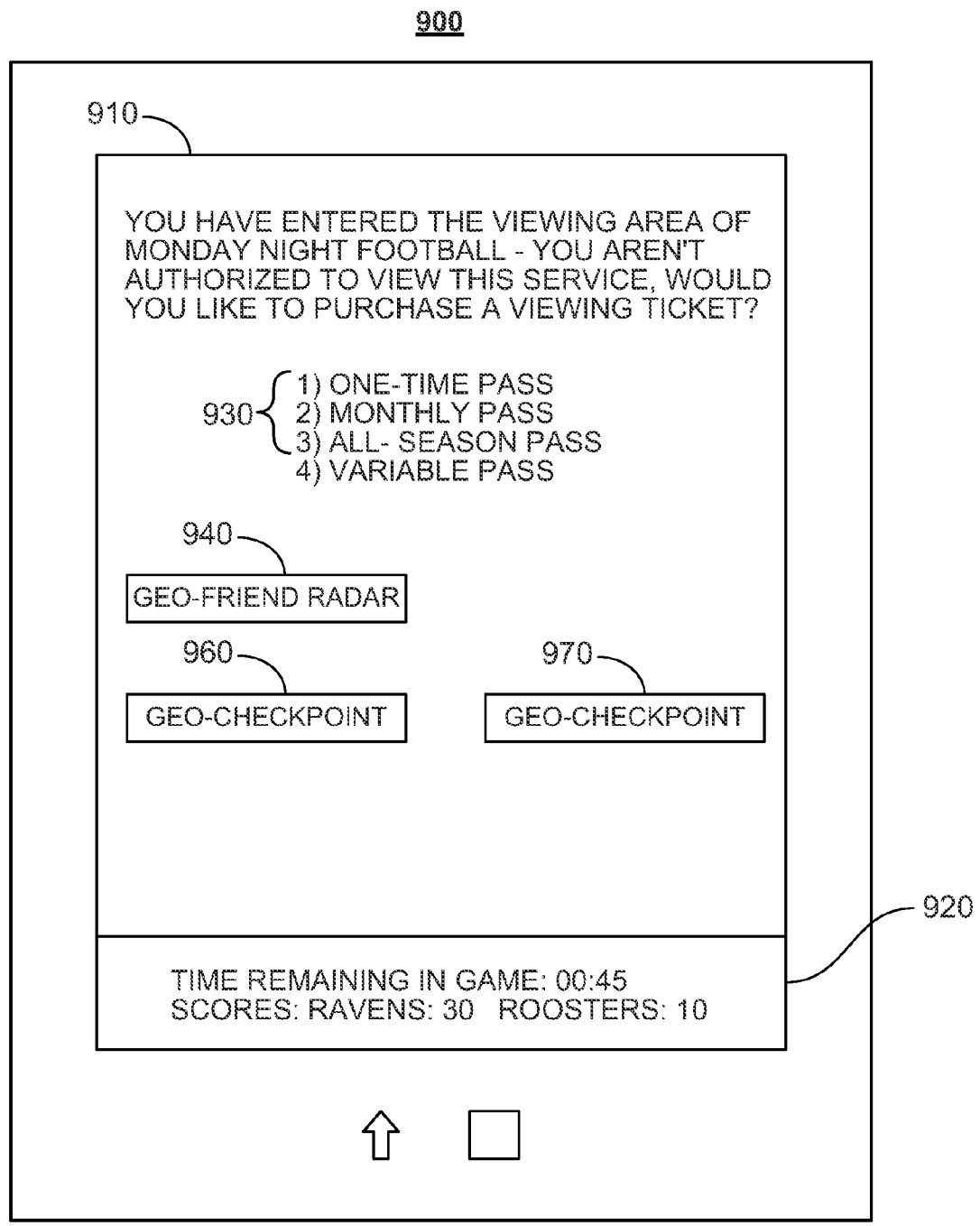
FIG. 9 illustrates a screen 900 that may be displayed on a personal user device in accordance with some embodiments of the present disclosure.

FIG. 9 illustrates a screen 900 that may be displayed on a personal user device in accordance with some embodiments of the present disclosure. Screen 900 includes two display regions 910 and 920.

Region 910 may display information about purchasing an access right to a content asset. For example, region 930 indicates three options for one-time access, monthly access, seasonal access, or variable access. One-time access enables a user to access the content asset for one session, the duration of the broadcast. Monthly access may enable a user to access the content asset over the period of a month. Seasonal access may enable a user to access the content asset for the duration of a broadcast season, or sports. Variable access will be described in further detail below, but charges the user based on a various different factors. The term season may be understood in the context of television broadcast schedules.

Region 910 may include selectable menu options 940, 960 and 970. In some embodiments, selectable menu option 940 may be used to activate a geo-location program to detect nearby users that may be interested in a first content asset described in Region 920, and/or are associated with the user of the personal user device on which screen 900 is displayed. In some implementations, the presence of nearby users may be determined based on queries to a web server hosting a social network. For example, in response to receiving a selection of menu option 940, control circuitry 304 of the personal user device may transmit a query to a web server 430 that hosts a social network, to determine whether any friends associated with a first user of the personal user device are located nearby. For example, control circuitry 304 may transmit location coordinates of the personal user device and guidance data associated with the first content asset indicated in Region 920 to the web server. Responsive to receiving the location coordinates and guidance data from the personal user device, control circuitry of the web server 430 may determine if any friends associated with the first user are located nearby, and whether any of the nearby friends may be interested in the first content asset based on the received guidance data and user profile information of the nearby friends.

Control circuitry of the web server may transmit location coordinate information and user profile information for the nearby friends to the personal user device of the first user. Control circuitry of the personal user device may generate a map display of nearby users, indicating how many friends associated with the user are nearby and may be interested in watching the first content asset. It should be understood that the above described steps may be performed in any combination on the web server or personal user device. For example, control circuitry of the web server may transmit location coordinate information and user profile information of nearby friends associated with the first user to the personal user device, and control circuitry of the personal user device may determine based on the received user profile information, how many of the nearby users may be interested in the first content asset.

In some implementations, the presence of nearby users may be determined based on queries to nearby devices based on Bluetooth, or any suitable communications path as described above in reference to FIG. 3 and FIG. 4. For example, control circuitry of the personal user device may detect other nearby user devices and receive user profile information from the nearby devices. Control circuitry 304 of the personal user device may compare preference information from the received user profile information with the guidance data of the first content asset indicated in Region 920. Control circuitry 304 of the personal user device may then direct the display of the personal user device to show a listing or mapping of detected nearby users that may be interested in the first content asset.

In some embodiments, selectable menu option 960 may be used to activate check-in services based on the geographic location of a first user of a first personal user device. In some implementations, the first user may indicate geographic position on a social network by selecting menu option 960. For example, in response to receiving a user selection of menu option 960, control circuitry of the first personal user device may transmit location coordinate information to a web server 430 that is hosting a social network on which the user has an account.

For example, the first user may be able to access content that provides information, such as menus, reviews, event schedules, maps, or any other suitable content about the location of the first user. Control circuitry 304 of the first personal user device may transmit location coordinate information of the first personal user device to a web server 430. Control circuitry 304 of the web server 430 may retrieve content based on the location coordinate information of the first personal user device and transmit the content to the first personal user device. Control circuitry 304 of the first personal user device may display the received content information on the display of the first personal user device.

In some embodiments, selectable menu option 970 may be used to access a social network page of a user of a first personal user device, as described further below in reference to FIG. 15. In response to selection of option 970, control circuitry 304 of the first personal user device may direct the display to show a screen 1500 of FIG. 15 that illustrates a social network page of the user.

Region 920 may include information about the content asset that will be shown, or is currently shown. For example, if the content asset is a sporting event, region 920 may display scores or statistics about the participant teams.

Screen 900 may be displayed to a user in response to the user entering a predetermined proximity of a shared media equipment device 402, before or during the broadcast of a content asset that requires an access right. For example, in a sports bar, a user may enter the viewing area for a football game. In response to entering the viewing area, the user may be detected by the shared media equipment device 402. For example, processing circuitry 306 may receive an indication and identity from detecting circuitry 307 that the user has entered the predetermined proximity of the shared media equipment device. Processing circuitry 306 may retrieve content authorization information corresponding to the identified user. In response to determining that the user is not authorized to view the football game, processing circuitry 306 may transmit the information to a personal user device 406 of the user to display screen 900 to the user.

The user may enter a purchase order using personal user device 406. For example, processing circuitry in the personal user device 406 may receive input from the user on user input interface 310. The processing circuitry may transmit the order information to the shared media equipment device 402.

In some embodiments, the personal user device 406 may be a tablet computer or smart phone carried by the user at all times. The user may be identified and detected by the personal user device. As an example, an unauthorized user entering the predetermined proximity of a shared media equipment device 402 during the broadcast of a sporting event may be prompted by screen 800 to purchase an access right or leave the predetermined proximity. The user may decide to use screen 900 on personal user device 406 to purchase an access right.

In some embodiments, a user may not have a tablet computer or smart phone. The user may be detected by biometric detection techniques instead of wireless detection techniques, which have been described previously. If the user enters the predetermined proximity of a shared media equipment device 402 while during broadcast of a content asset that the user is unauthorized to access, screen 800 of FIG. 8 may be shown on a display 312 of the shared media equipment device 402. The unauthorized user may be identified in region 830 of the screen 800. Because the user does not have a tablet computer, the user may need to access screen 900 from a public user equipment. For example, shared media equipment device 402 may transmit the information for screen 900 to a laptop computer 406 that is publicly accessible. The user may place an order using the laptop computer 406. The user may receive a temporary personal device such as an RFID tag to carry while viewing the content asset on the shared media equipment device within the predetermined proximity. The personal device may identify the user as having an access right to view the content asset. For example, detecting circuitry 307 of shared media equipment device 402 may wirelessly detect the RFID tag, biometrically identifying the user. Detecting circuitry 307 may determine that the wireless RFID tag and user are in the same location. Processing circuitry 306 of the shared media equipment device may receive this information and determine that the user is authorized to view the content asset based on the presence of the RFID tag.

In some implementations, a user may purchase a variable pass. The fee charged for a variable pass may change based on several factors. The viewing experience of a user may vary significantly based on relative position of the user to the display. Also, users may not stay for the entire duration of a broadcast. The detection techniques described previously enable a system to track how much time a user spends within a predetermined proximity and the position of the user within the predetermined proximity. The fee charged for a variable pass may change as a function of the amount of time a user spends within a predetermined proximity and the location of the user within the predetermined proximity. This may be a useful feature for users who only intend to watch a portion of a content asset, but not a whole content asset. For example, a user may be charged $1.00 for each half hour located within a predetermined proximity. The user may be discounted $0.10 per half hour for each meter away form a display of shared media equipment device during broadcasting the content asset.

For example, detecting circuitry 307 of shared media equipment device 402 may detect, identify and locate an authorized user within the predetermined proximity. Processing circuitry 306 may store a fee variable corresponding to the user in storage 308. While detecting circuitry 307 detects the user within the predetermined proximity, processing circuitry will increase the fee variable corresponding to the user according the variable rate, and apply any applicable discounts.

In some implementations, rate charged for a variable pass may change depending on the period of the game. For example, the fee charged during an intermission in the game broadcast would be lower than the fee charged during game play.

In some embodiments, diagram 600 may be displayed in screen 900 as an overlay or window in the video display region 910. For example, after a user enters the predetermined proximity of a shared media equipment device, processing circuitry 306 of a personal user device corresponding to the user may receive information of display screen 900 from the shared media equipment device, as described above. Processing circuitry 306 may then direct display 312 of the personal user device to show display 900 with diagram 600.

Display of the diagram 600 enables a user to visualize the number of detected viewers who are unauthorized to view a selected content asset as described above in reference to FIG. 7 and FIG. 8. This enables the personal user device to qualitatively show how many users are authorized to view the content asset and the accordingly interest of detected viewers in viewing the content asset. In some implementations, the diagram 600 may show how many authorized viewers are related to the newly detected unauthorized viewer. For example, processing circuitry 306 may compare the identification information of the viewers corresponding to the circular regions illustrated in FIG. 6 with a list of users in a phonebook of the viewer stored on the personal user device, if the personal user device is a smart phone. For example, processing circuitry 306 may compare the identification information of the viewers corresponding to the circular regions illustrated in FIG. 6 with a list of users in related to the unauthorized viewer that is stored on a social network. By incorporating related users into diagram 600, processing circuitry of a personal user device may indicate to a user how many related peers are authorized to view the content asset. If an authorized user sees that several related peers are viewing the content asset, the user may be motivated to purchase an access right to view the selected content asset.

Figure 10:
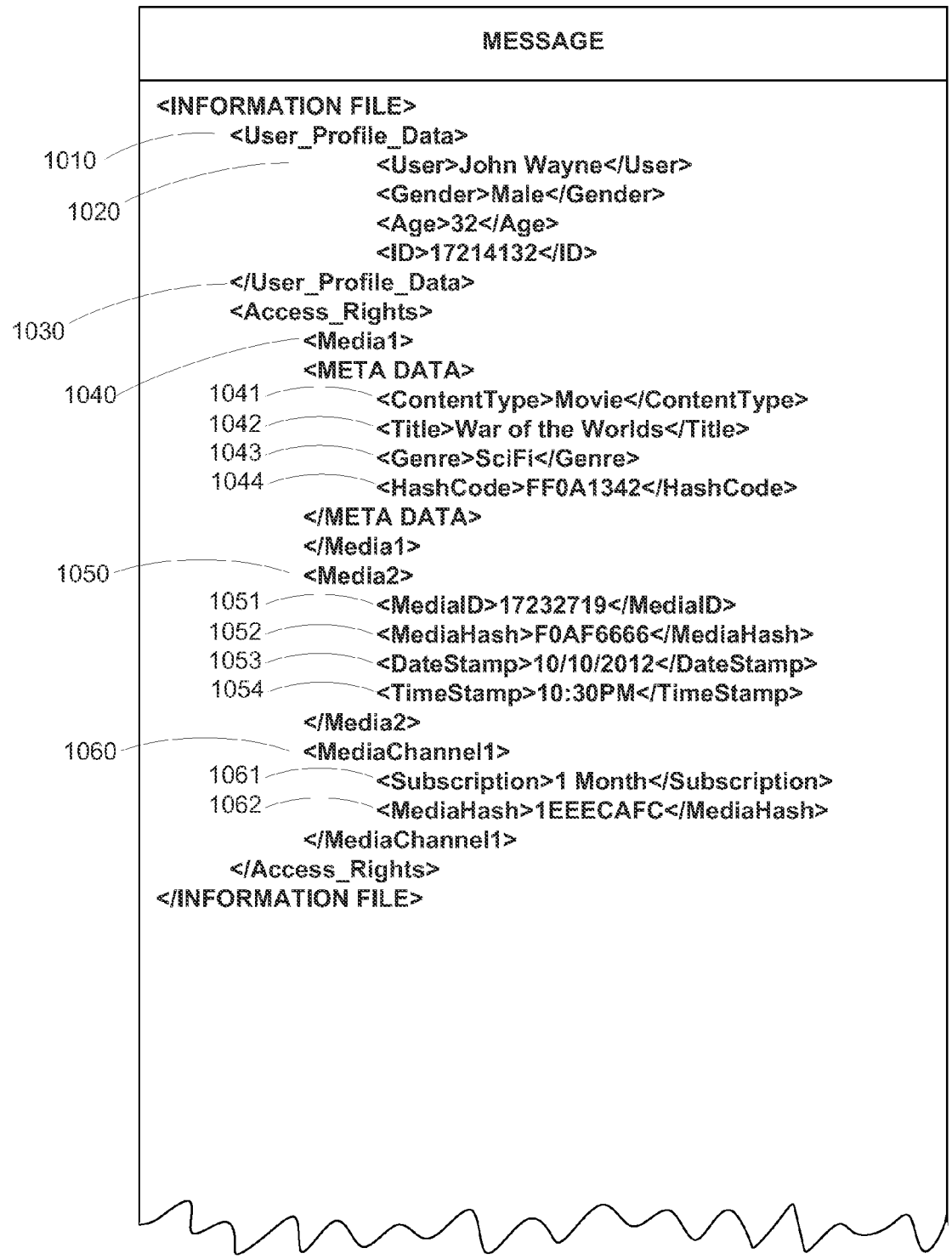
FIG. 10 illustrates an example of a message 1000 that may be transferred between a shared media equipment device and a personal user device in accordance with some embodiments of the present disclosure.

FIG. 10 illustrates an example of a message 1000 that may be transferred between a shared media equipment device and a personal user device in accordance with some embodiments of the present disclosure. The transferred message may carry information about the identity of the user and content authorization information for the user. The message may include user profile information section 1010 containing user profile data 1020. The message may include section 1030 that contains access right and permission information. Section 1030 may include access right information for content assets 1040 and 1050 and content 1060.

User profile information section 1010 is used to identify the user. Section 1010 may include descriptive information 1020 about a user such as user ID number, name, gender, age, any other suitable user profile information as described above or any combination thereof. The user ID number may be a unique number assigned to identify a user. Examples of such ID numbers may include national identity card numbers, social security numbers, passport numbers, or a hash code generated from the full name and birth date of the user.

In some implementations, user profile information may also contain preference information about the kind of content preferred by a user (not shown in FIG. 10). This may include favorite instances of media guidance data such as genre or title.

Section 1030 may include content authorization information which describes access rights to content assets and content and permission information. The access rights may describe conditions of access to one or more content assets, one or more content, or any combination thereof. The term subscription may refer to any grouping of content and content assets that are provided by a content service provider for a period of time, and that depend on the terms of a service agreement between a user and the copyright owner or distributor. For example, a user may be subscribed to access the entire television series of Battle Star Galactica. For example, the user may be subscribed to a sports broadcast package that grants access to a number of pay-per-view shows or number of sports channels.

Parental control information may include, for example, restricted television programs, restricted program titles, restricted channels, restricted ratings, restricted actors, restricted producers, restricted musical artists, restricted sponsors, restricted metadata terms, restricted themes, restricted genres, restricted categories, restricted time periods, restricted limits for purchasing content, and/or any other suitable restrictions. Parental control information may be independent of access right information. Parental control information may also be part of an access right as a content rating field in metadata.

The distributor restriction information may be a flag, identification code, hash code, any other suitable information, or any combination thereof. As an example, distributor restriction information may be part of information about an access right. The distributor restriction may be an identification number for a service provider. When the content authorization information is analyzed, a first user and a second user may not be able to view a content asset on a common device if each user is subscribed to a different service provider.

Subscription information may include an ID number of the user, an account number with a service provider, a duration of the subscription, and a hash code. The ID number may be used to verify the identity of the user and the account number may be used to verify the services subscribed by the user. The duration may indicate the length of the subscription from a start date of service, expiration date of the service, time remaining available in the subscription, any other suitable duration information or any combination thereof. The hash code may be a unique number assigned to the user that is compared with a value stored on a central server. The hash code is only valid for the duration of the subscription. After the subscription has expired, the user will need to renew the subscription and obtain a new hash code in order to continue maintaining access to the subscribed services.

Listing 1040 is an example of an access right for a content asset described by metadata, which may include information that describes a content asset such as the content type, title, genre, composer, author, performer, file size, and time length of the content asset. Listing 1040 provides an example access right described by metadata. The listing describes a content asset having a content-type 1041 of movie, title 1042 of "War of the Worlds," and genre 1043 of sci-fi. Hash codes may be used to securely protect metadata stored in plain text from tampering by unauthorized users.

For example, in response to receiving a purchase request from a user for an access right to the movie, War of the Worlds, processing circuitry 306 of a shared media equipment device may generate the access right information shown in listing 1040. Processing circuitry 306 may compute the hash code 1044 as the result of hashing a concatenation of the metadata 1041-1043, using a hashing algorithm only usable by processing circuit 306 of the shared media equipment device. The access right listing 1040 may then be transmitted to a personal user device of the purchasing user, or updated in an online service 430.

Modification of the plain text metadata in listing 1040 without modification of the hash code would corrupt the information in the listing 1040. When processing circuitry 306 next retrieves the content authorization information for the user, including access right listing 1040, it can verify whether the listing has been compromised, by re-computing the hash code based on meta-data 1041-1043, and comparing with hash code 1044. If the computed and stored hash code match, processing circuitry 306 determines that the user is authorized to access the content asset corresponding to listing 1040. If the hash codes do not match, processing circuitry 306 determines that the user is unauthorized to access the content asset, and may invoke a penalty on the user, such as fine, or revocation of all access rights in the content authorization information of the user.

Listing 1050 is an example of an access right for a content asset described without metadata. Listing 1050 includes an ID number 1051, hash code 1052, date stamp 1053, and time stamp 1054. ID number 1051 may be a unique ID number for the content asset. Date stamp 1053 and time stamp 1054 may indicate a date and time at which the access right expires. Hash code 1052 may be a hashed value of an ID number, date information, time information, user profile information, any other suitable content authorization information or subscription information or any combination thereof. The hash code may prevent against tampering of the access right.

Referring back to the example above, processing circuitry 306 of a shared media equipment device may receive a request from a user to purchase an access right to the movie, War of the Worlds. In response to receiving the purchase request, processing circuitry 306 may generate the access right information shown in listing 1050. The ID number 1051 may correspond to the movie War of the Worlds in a content source 416. Date stamp 1053 may refer to the date on which the access right expires. Time stamp 1054 may indicate a time when the access right expires. Processing circuitry 306 may compute hash code 1052 based on ID number 1051, date stamp 1053, and time stamp 1054. The access right listing 1050 may then be transmitted to a personal user device of the purchasing user, or updated in an online service 430.

Modification of the plain text date stamp and time stamps in listing 1050 without modification of the hash code would corrupt the information in the listing 1050. When processing circuitry 306 next retrieves the content authorization information for the user, including access right listing 1050, it can verify whether the listing has been compromised, by re-computing the hash code and comparing to the stored hash code 1052. If the computed and stored hash code match, processing circuitry 306 determines that the user is authorized to access the content asset corresponding to listing 1040. If the hash codes do not match, processing circuitry 306 determines that the user is unauthorized to access the content asset.

Listing 1060 is an example of an access right for accessing a channel. The listing may include subscription term 1061, which indicates the duration of the subscription. Other variants of 1061 may include one-time, annual or seasonal, as described previously in reference to FIG. 9. Hash code 1062 may be a hashed value of an ID number, date information, time information, user profile information, any other suitable content authorization information or subscription information or any combination thereof. In this case, only the hashed value is stored to reduce the amount of information about the access right that needs to be stored or transmitted. It should be understood that other variants and combinations of the information described previously may also be used to describe access rights to content assets.

For example, in response to receiving a purchase request from a user for an access right to a pay-per-view sports channel, processing circuitry 306 of a shared media equipment device may generate the access right information shown in listing 1060. Processing circuitry 306 may compute the hash code 1062 as the result of hashing a concatenation of the metadata fields such as the name of the channel, date stamp and time stamp of when the access right is purchased, and subscription duration 1061. The access right listing 1060, including the hash code 1062 and subscription period 1061, may then be transmitted to a personal user device of the purchasing user, or updated in an online service 430. In some embodiments, the access right information may be stored on the personal user device and an mail. Additional information may be stored on the online service 430, such as plain text information about the channel name and number, user identification information, subscription information, and the hash code 1062.

When processing circuitry 306 next retrieves the content authorization information for the user, including access right listing 1060, it can verify whether the listing has been compromised. It may retrieve content authorization information from the personal user device, and from the online service 430. It may compare the hash code stored in the personal user device with the hash code retrieved from the online service. If the hash codes match, processing circuitry 306 determines that the user is authorized to access the channel corresponding to listing 1060. If the hash codes do not match, processing circuitry 306 determines that the user is unauthorized to access the channel.

As shown above, the content authorization information for a user may include varying formats to describe access rights to content and content assets. Analysis of the access rights to determine the intersection of the access rights may require specific steps and additional information.

In some embodiments, the metadata that describe the content assets and content corresponding to an access right may be retrieved from a distributor of that content. The plain-text information in the metadata may then be analyzed. For example, fields of the metadata may be compared to determine overlap.

In some implementations, an access right may refer to a package of content assets or to a channel. For example, one access right may grant access to a specific sporting event. Another access right may grant access to the channel on which the sporting event is broadcast. When determining the intersection of access rights between a broad and narrow access right, the narrower access right may be selected for inclusion in the intersection.

In some embodiments, the content authorization information shown in FIG. 10 may be analyzed to generate diagram 600 of FIG. 6. In response to detecting and identifying a first user and second user, control circuitry 304 of a shared media equipment device may retrieve first content authorization information associated with the first user, and second content authorization information associated with the second user.

In some implementations, metadata corresponding to each access right information 1040, 1050 and 1060, may be analyzed. The metadata may be contained within the access right listing, such as listing 1040, or may not be contained within the access right listing and must be retrieved. For example, control circuitry 304 of the shared media equipment device may retrieve metadata corresponding to each access right of the first and second content authorization information from a media guidance data source 418, and determine the intersection of content assets corresponding to the access rights. Control circuitry 304 may compare the metadata fields such as content type 1041 or title 1042, to determine whether first user and second user are authorized to access the same content asset.

In some implementations, the control circuitry 304 may compare the information of access right listings included in the first content authorization data and the second content authorization data, without the use of metadata, to determine whether the first and second users are authorized to access the content asset. For example, control circuitry 304 may extract a first listing from first content authorization information and a second listing from second content authorization information, where the first and second listings are formatted according to listing 1050, and compare fields 1051-1054 to determine whether the first and second users are authorized to access the content asset.

In some implementations, the control circuitry 304 may compare information of access right listings associated with different types of content assets or content to determine whether there is an intersection of content assets that may be accessed. For example, first content authorization information may contain a first access right to a subscription channel, and second content authorization information may contain a second access right to a television show that is broadcast on the subscription channel. Control circuitry 304 may retrieve and analyze metadata corresponding to the first and second access rights to determine that the first user and second user are authorized to access the same television show, even though the first user is authorized to access more content assets on the subscription channel.

In some implementations, content authorization information may include an access right to access content which requires authorization from the provider of the content. In some implementations, a content asset requiring authorization from a content provider may restrict access to the content asset by, for example, encrypting the content asset. For example, in order to access an encrypted content asset, processing circuitry 306 of a media equipment device may transmit an access right to a web server 430. At the web server, processing circuitry 306 may receive the transmitted access right and compare with a database of users and access rights stored in storage 308. In response to determining that the user corresponding to the transmitted access right is authorized to access the broadcast content asset, processing circuitry 306 of the web server 430 may transmit an encryption key to the media equipment device to enable the media equipment device to decrypt the encrypted content asset.

In some embodiments, as described above in reference to FIG. 7, screen 700 may be shown to a user on a shared media equipment device. Control circuitry 304 of the shared media equipment device may store content authorization information, formatted according to message 1000 of FIG. 10, that includes an access right to the upcoming broadcast of the live sporting event. Control circuitry 304 of the device may receive an input from a user to access a different live sporting event broadcast on a different channel, and in response retrieve a different access right from a content source corresponding to the different sporting event broadcast.

In some embodiments, as described above in reference to FIG. 8, screen 800 may be shown to a group of users on a shared media equipment device during access of a content asset, in response to detecting a new user entering the predetermined proximity of the media equipment device. For example, control circuitry 304 of the shared media equipment device may detect and identify a new user entering the predetermined proximity by wireless detecting a personal user device associated with the user or biometrically detecting and identifying the user. Control circuitry 304 may retrieve content authorization information associated with the new user, as message 1000 of FIG. 10. Control circuitry 304 may extract from user profile data 1010 that the user is "John Wayne," and that the associated access right listings 1040, 1050 and 1060 do not include an access right to live sporting event accessed on the shared media equipment device. In response, control circuitry 304 of the shared media equipment device may display the name "John Wayne" as an unauthorized user in region 630, and display a message requesting purchase of an access right.

In some embodiments, display 900 of FIG. 9 may be shown on a personal user device to a user, in response to detection and/or identification of the user, and determination by a shared media equipment device, that the user is unauthorized to access a content asset that is displayed by the shared media equipment device. The determination may be made based on content authorization information retrieved from a web server 430. In response to receiving a purchase request from the user, as described further below in reference to FIGS. 12 and 13, control circuitry 304 of a shared media equipment device may transmit content authorization information, including an access right to the sporting event for the user, to update the central web server 430. The content authorization information may be formatted according to message 1000 of FIG. 10, and include a subscription term 1061 that lasts for the duration of the live sporting event.

Figure 11:
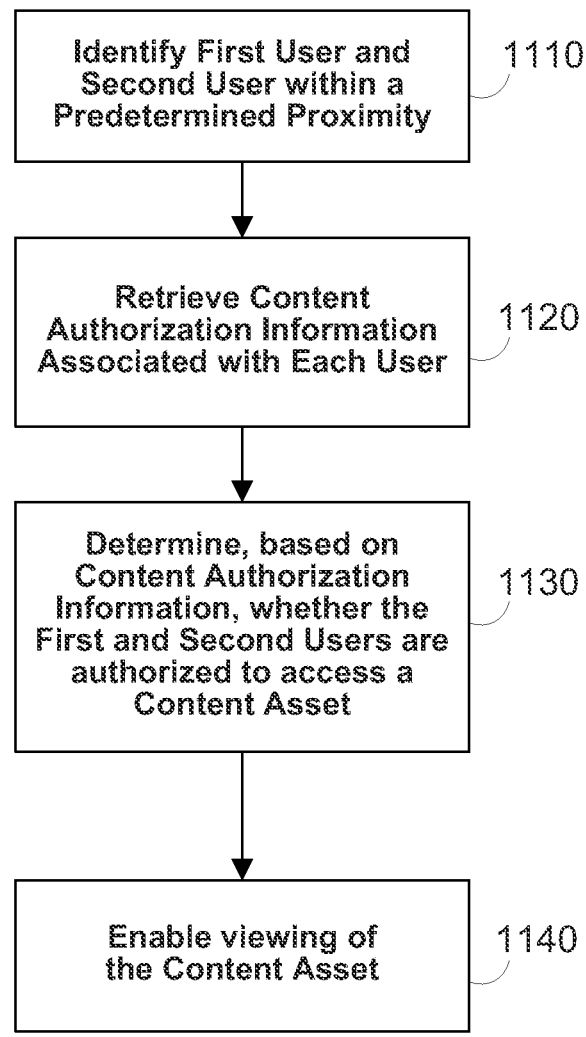
FIG. 11 illustrates an example of a flowchart of steps 1100 that may be performed by a shared media equipment device in accordance with some embodiments of the present disclosure.

FIG. 11 illustrates an example of a flowchart of steps that may be performed by a shared media equipment device in accordance with some embodiments of the present disclosure. At step 1110 a first user and second user are identified. For example, a first user and second user may enter a predetermined proximity of a shared media equipment device. Detecting circuitry 307 of the shared media equipment device may detect the first and second user using biometric detection techniques or wireless detection techniques if the first and second users each possess a personal user device such as a tablet computer or smart phone. In some embodiments, a first and second user may request to access a content asset on a shared media equipment device. For example, processing circuitry 306 of the shared media equipment device may receive the access request from user input interface 310.

At step 1120, the shared media equipment device retrieves content authorization information corresponding to the first user and the second user. For example, processing circuitry 306 of the shared media equipment device may receive identification information from detecting circuitry 307. In some embodiments, the content authorization information may be retrieved from a database on the internet. Processing circuitry 306 may issue a query to an online service to retrieve the content authorization information for the first and second users. In some embodiments, the content authorization information may be retrieved from a first personal user device belonging to the first user, and a second personal user device belonging to the second user. For example, processing circuitry may issue a request for content authorization information from a personal user device 406. In response to receiving the request, the processing circuitry within the personal user device may transmit the content authorization information to the shared media equipment device in a format similar to the message described in FIG. 10.

At step 1130, the shared media equipment device analyzes the retrieved content authorization information for the first and second user. The shared media equipment device may need to request metadata or other information corresponding to each of the access rights described in the content authorization information. For example, processing circuitry 306 may issue a request to an online service to retrieve metadata information relating to the access rights of the first and second user. After receipt of the metadata, processing circuitry 306 may then analyze the metadata corresponding to the access rights to determine the intersection of the access rights common to the first and second user.

After analyzing the content authorization information, the shared media equipment device may determine whether the first and second user are authorized to access a content asset. In some embodiments, the shared media equipment device may determine whether the first and second users are authorized to access the content asset requested in step 1110. For example, processing circuitry 306 may compare the requested content asset with the determined intersection of access rights. Processing circuitry 306 may compare the metadata of the requested content asset with the metadata of the intersection of access rights.

At step 1140, the shared media equipment device enables access to the content asset in response to determining that the first and second users are authorized to access the requested content asset. In response to determining that the first and second users are unauthorized to access the requested content asset, the shared media equipment device will not enable access to the content asset. For example, processing circuitry 306 in a shared media equipment device may direct display 312 of the shared media equipment device to show the requested content asset to the first and second users.

Figure 12:
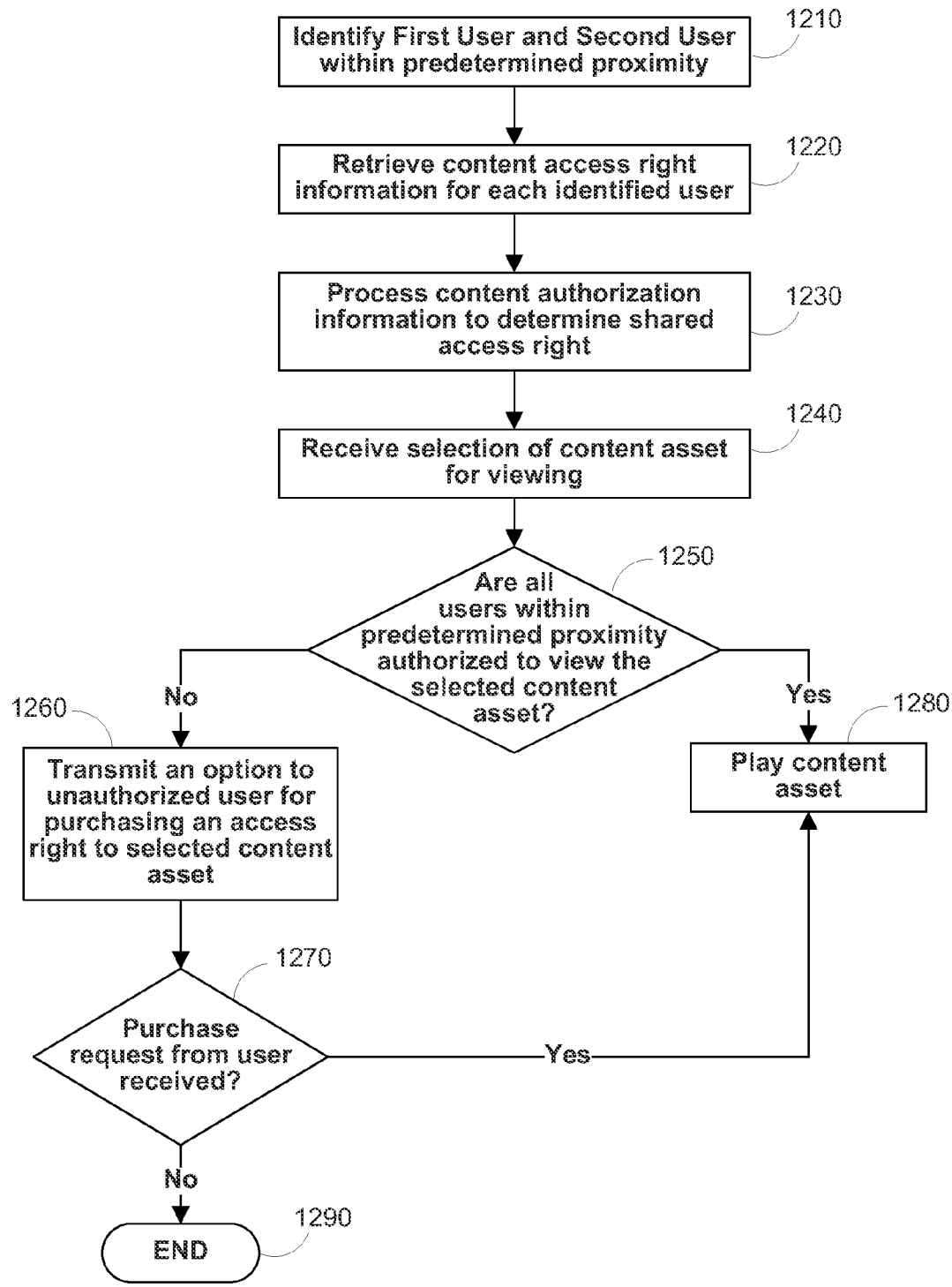
FIG. 12 illustrates an example of a flowchart of steps 1200 that may be performed by a shared media equipment device to enable a user to purchase an access right to a content asset in accordance with some embodiments of the present disclosure.

FIG. 12 illustrates an example of a flowchart of steps that may be performed by a shared media equipment device to enable a user to purchase an access right to a content asset in accordance with some embodiments of the present disclosure.

At step 1210, a first user and second user are identified within a predetermined proximity of a shared media equipment device. For example, detecting circuitry 307 of a shared media equipment device may detect and identify the first and second users by wireless detection techniques or biometric detection techniques. The wireless detection techniques may be used if a user has a personal user device that can be wirelessly identified.

At step 1220, content authorization information is retrieved for each identified user. In some implementations, the content authorization information may be retrieved from a personal user device carried by the user. For example, processing circuitry 306 of shared media equipment device 402 may receive a message containing content authorization information from a personal user device such as a tablet computer carried by the user. In some implementations, the content authorization information may be retrieved from an online service. For example, processing circuitry 306 may receive identity information from detecting circuitry 307. In response to receiving the identity information, processing circuitry 306 may send a request containing the user identity information to an online service to request content authorization information corresponding to the user.

At step 1230, the retrieved content authorization information is processed and analyzed to determine shared access rights. For example, processing circuitry 306 of shared media equipment device 406 may retrieve metadata for the access rights of each user. Processing circuitry 306 may compare retrieved metadata to determine overlap or intersection among the access rights of the first and second user. A listing of content assets and content may be displayed to the user. For example, processing circuitry 306 of the shared media equipment device 406 may direct display 312 to show a listing of content assets to the first and second users. The listing may include content assets that both users are authorized to access, neither user is authorized to access, or only one of both users may be authorized to access.

At step 1240, a selection of a content asset for viewing is received. For example, the first and seconds users may select one of the content asset listings shown on shared media equipment device 402 for viewing. Processing circuitry 306 of shared media equipment device 402 may receive a user selection of a content asset from user input interface 310.

At step 1250, a determination is made whether all users within a predetermined proximity of the media shared media equipment device are authorized to view the selected content asset. For example, processing circuitry 306 may compare metadata for the selected content asset with metadata corresponding to the access rights of each user. In response to determining that all users are authorized to view the selected content asset, the process proceeds to step 1280, otherwise the process proceeds to step 1250.

At step 1260, an option to purchase an access right to the selected content asset is transmitted to the unauthorized user. For example, screen 900 of FIG. 9 may be shown. In some implementations, the option may be displayed on a personal user device of the new user. For example, processing circuitry 306 of the shared media equipment device may transmit the information for screen 900 and an ID number of the content asset to the detected personal user device of the new user. In response to viewing screen 900, the user may submit a purchase request for an access right using personal user device 406. For example, processing circuitry 406 of the personal user device may transmit a purchase request including payment information and the ID number of the requested content asset to the shared media equipment device 406. In response to submitting the purchase request, a user may be granted an access right to view the content asset. In some implementations, the access right may be transmitted to the personal user device of the user. For example, processing circuitry 306 of the shared media equipment device 402 may transmit a message containing information about the access right to personal user device of the user, for addition to the content authorization information stored on the personal user device.

In some implementations, the new option may be displayed on a publicly accessible personal user device such as a laptop computer. In this implementation, the user may not possess a personal user device. For example, processing circuitry 306 of the shared media equipment device may transmit the screen information to a laptop computer 403. In response to viewing the screen 900 on the laptop computer, the user may submit a purchase request using the laptop computer. For example, processing circuitry 406 of the laptop computer may transmit a purchase request including payment information and the ID number of the requested content asset to the shared media equipment device 406. In response to submitting the purchase request, an access right may be granted to the user. For example, an access right to the content may be added to the content authorization information of the user stored on the online service. Processing circuitry 306 of the shared media equipment device 402 may send a message containing an access right to an online service to add the access right to the content authorization information of the user.

At step 1270, a determination is made whether a purchase request is received from the unauthorized user. If the purchase request is not received, the process ends. If the purchase request is received, the process may proceed to step 1280. For example, processing circuitry 306 of shared media equipment device 402 may poll for a purchase request from a user for predetermined period of time. If the predetermined time elapses, processing circuitry 306 may reset. Alternatively, a purchase request may be received by processing circuitry 306 before the predetermined time elapses. In some implementations, the purchase request may be received from a personal user device corresponding to a user. In some implementations, the purchase request may be received from a public computer terminal.

At step 1280, the selected content asset is played back. For example, processing circuitry 306 of shared media equipment device 402 may direct display 312 to play back the selected content asset.

Figure 13:
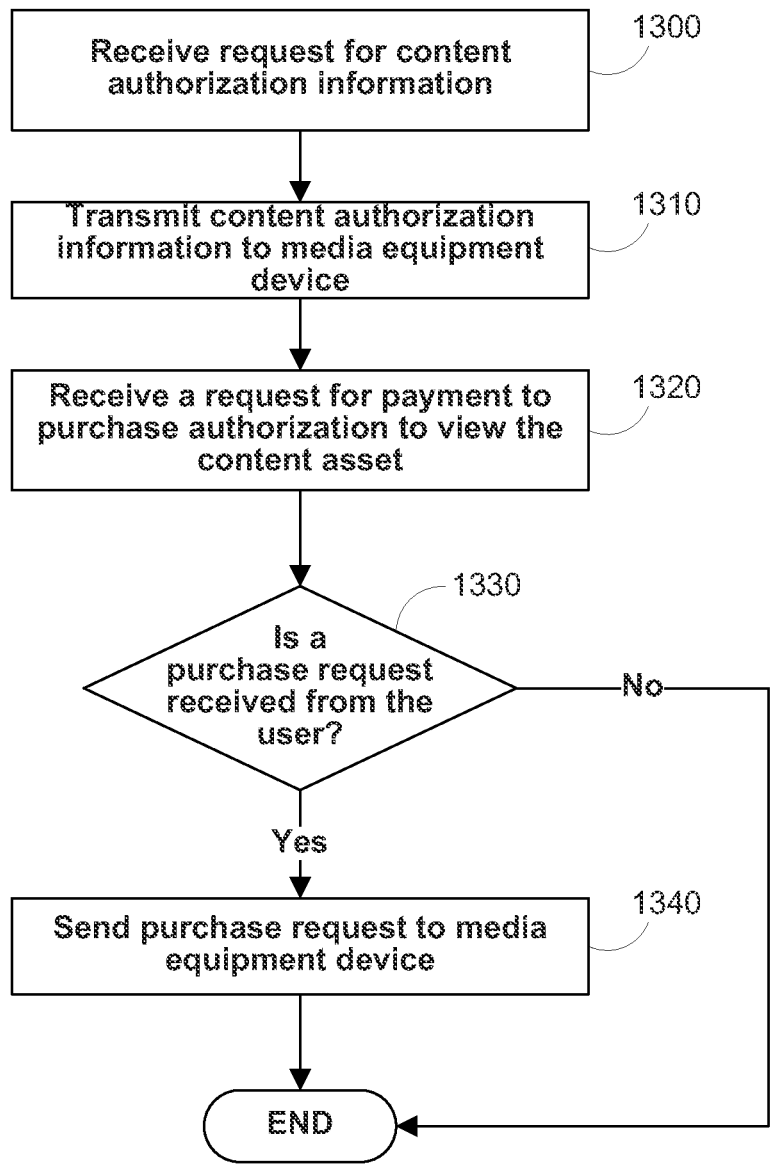
FIG. 13 illustrates an example of a flowchart of steps 1300 that may be performed by a personal user device to enable a user to purchase an access right to a content asset in accordance with some embodiments of the present disclosure.

FIG. 13 illustrates an example of a flowchart of steps that may be performed by a personal user device to enable a user to purchase an access right to a content asset in accordance with some embodiments of the present disclosure At step 1300, the personal user device receives a request for content authorization information. For example, a user carrying the personal user device may enter the predetermined proximity of a shared media equipment device 402 and be detected. Processing circuitry 306 of the personal user device may receive a request for the content authorization information from the shared media equipment device.

At step 1310, the personal user device transmits content authorization information for the user corresponding to the personal user device. For example, processing circuitry 306 of the personal user device may transmit a message including content authorization information as illustrated in FIG. 10 to the shared media equipment device 402.

At step 1320, the personal user device receives a request for payment to purchase an authorization to view a content asset. For example, the user may be located within the predetermined proximity of a shared media equipment device 402 but not be authorized to view a content asset currently shown on the shared media equipment device. Processing circuitry 306 of the personal user device may receive a message containing a request for payment from the user. In response to receiving the message, processing circuitry 306 of the personal user device may direct display 312 of the personal user device to show screen 900 of FIG. 9. If the user were authorized to view the content asset, the user would not receive the request for payment.

At step 1330, a purchase order is received from the user by the personal user device. The user may purchase the access right using the menu of screen 900 shown in FIG. 9. In response to receiving a purchase order from user input interface 310, the personal user device may transmit a message including payment information and an ID of the content asset to shared media equipment device 402. The process may then proceed to step 1340. If a purchase order is not received from the user, the process ends.

At step 1340, a purchase request is sent from the personal user device to the shared media equipment device 402. The purchase request may contain payment information such as credit card account information, debit card account information, bank account information or any other suitable payment information, and an ID number for the content asset for which an access right is purchased. For example, the processing circuitry 306 of the personal user device may transmit the purchase request information on I/O path 302 through communications network 414 to the shared media equipment device 402.

Figure 14:
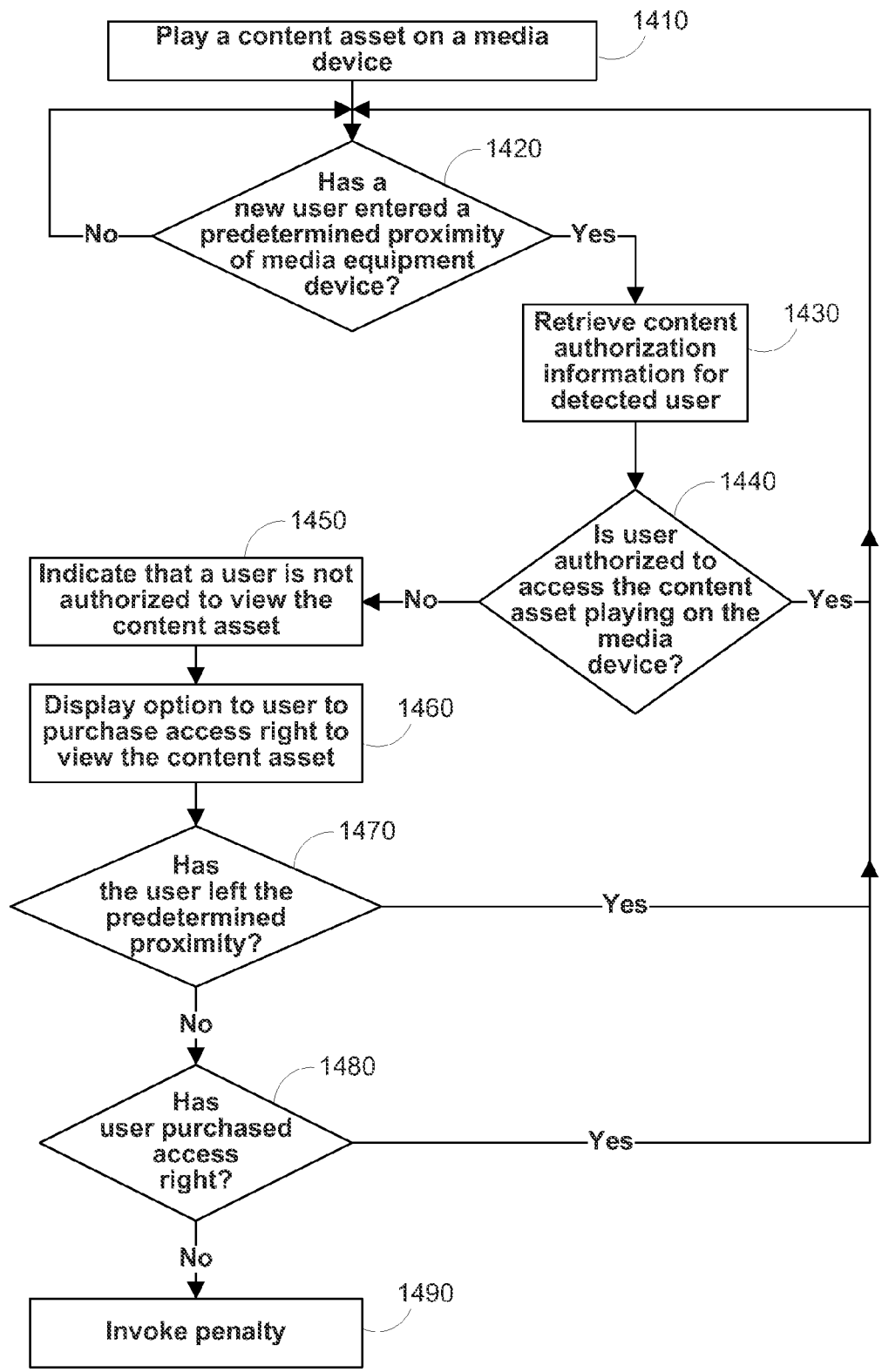
FIG. 14 illustrates an example of a flowchart of steps 1400 that may be performed by a shared media equipment device in response to detecting a user entering a predetermined proximity to the shared media equipment device in accordance with some embodiments of the present disclosure.

FIG. 14 illustrates an example of a flowchart of steps that may be performed by a shared media equipment device in response to detecting a user entering a predetermined proximity to the shared media equipment device in accordance with some embodiments of the present disclosure. In some embodiments, a shared media equipment device may be playing back a content asset when a user enters the predetermined proximity of the shared media equipment device. At step 1410, a shared media equipment device plays back a content asset. In some embodiments, step 1410 may correspond to step 1140 of FIG. 11, or take place after step 1140 of FIG. 11. For example, processing circuitry 306 of a shared media equipment device 402 may direct display 312 to show a content asset. In some implementations, the content asset is retrieved from storage in a shared media equipment device. For example, processing circuitry 306 may retrieve a file for the content asset from storage 308. In some implementations, the content asset may be a live broadcast received from the internet, cable, antenna, satellite or any other suitable communication means. For example, processing circuitry 306 may receive a broadcast stream for the content asset from I/O path 302.

At step 1420, a determination is made whether a new user has entered a predetermined proximity of the shared media equipment device. For example, processing circuitry 306 of shared media equipment device 402 may receive a signal from detecting circuitry 307 indicating that a new user has been detected or identified within the predetermined proximity. If a new user has been detected, the process proceeds to step 1230, otherwise the process returns to step 1420.

At step 1430, contention authorization information for the detected user maybe retrieved. In some implementations, the content authorization information may be retrieved from a personal user device carried by the user. For example, processing circuitry 306 of shared media equipment device 402 may receive a message containing content authorization information from a personal user device such as a tablet computer carried by the user. In some implementations, the content authorization information may be retrieved from an online service. For example, processing circuitry 306 may receive identity information from detecting circuitry 307. In response to receiving the identity information, processing circuitry 306 may send a request containing the user identity information to an online service to request content authorization information corresponding to the user.

At step 1440, a determination is made whether the user is authorized to access the content asset currently playing on the shared media equipment device. The determination may be made based on the retrieved content authorization information. For example, processing circuitry 306 of shared media equipment device 402 may analyze the access rights of the content authorization information for the user. Processing circuitry may determine if the user holds an access right to view the content asset by comparing metadata of the content asset to metadata of the access rights. Processing circuitry may compute the intersection of the access rights of the new user and the access rights of the group of users authorized to access the content asset. By comparing the metadata of the access rights of this intersection with metadata of the currently playing content asset, processing circuitry 306 may determine whether the user is authorized to access the content asset.

In response to determining that the newly detected user is authorized to view the content asset, the process returns to step 1420, otherwise the process returns to step 1450.

At step 1450, an indication is provided that a detected user is not authorized to view the content asset. In some embodiments, screen 800 of FIG. 8 may be displayed on shared media equipment device 402. For example, processing circuitry 306 of shared media equipment device 402 may direct display 312 to show screen 800 including the identity of the user. If the new user is unidentified, processing circuitry 306 may direct display 312 to indicate the user is unidentified.

At step 1460, an option to purchase an access right to view the content asset is displayed. For example, screen 900 of FIG. 9 may be shown. In some implementations, the option may be displayed on a personal user device of the new user. For example, processing circuitry 306 of the shared media equipment device may transmit the information for screen 900 and an ID number of the content asset to the detected personal user device of the new user. In response to viewing screen 900, the user may submit a purchase request for an access right using personal user device 406. For example, processing circuitry 406 of the personal user device may transmit a purchase request including payment information and the ID number of the requested content asset to the shared media equipment device 406. In response to submitting the purchase request, a user may be granted an access right to view the content asset. In some implementations, the access right may be transmitted to the personal user device of the user. For example, processing circuitry 306 of the shared media equipment device 402 may transmit a message containing information about the access right to personal user device of the user, for addition to the content authorization information stored on the personal user device.

In some implementations, the new option may be displayed on a publicly accessible personal user device such as a laptop computer. In this implementation, the user may not possess a personal user device. For example, processing circuitry 306 of the shared media equipment device may transmit the screen information to a laptop computer 403. In response to viewing the screen 900 on the laptop computer, the user may submit a purchase request using the laptop computer. For example, processing circuitry 406 of the laptop computer may transmit a purchase request including payment information and the ID number of the requested content asset to the shared media equipment device 406. In response to submitting the purchase request, an access right may be granted to the user. For example, an access right to the content may be added to the content authorization information of the user stored on the online service. Processing circuitry 306 of the shared media equipment device 402 may send a message containing an access right to an online service to add the access right to the content authorization information of the user.

At step 1470, a determination is made whether the unauthorized user has left the predetermined proximity of the shared media equipment device. For example, processing circuitry 306 may poll detecting circuitry 307 to see if the user is still detected by wireless detection techniques or biometric detection techniques. In response to determining that the user is no longer detected, the process may return to step 1220. In response to determining that the unauthorized user is still detected, the process may proceed to step 1280.

At step 1480, a determination is made whether the user has purchased an access right to view the content asset. For example, processing circuitry 306 of shared media equipment device 402 may check whether a purchase request has been received from a user within a predetermined time. In response to determining that the user has purchased an access right, the process may return to step 1420. In response to determining that the user has not purchased an access right, the process may proceed to step 1490.

At step 1490, a penalty is invoked. For example, the viewing of the content asset may be disabled for all users. This invocation of the penalty is done to enforce the access rights and prevent an unauthorized viewer from watching the content asset. For example, processing circuitry 306 may direct display 312 to stop showing the content asset.

In some implementations, actions other than cessation of play back of the content asset may be done. For example, audio of the content asset may be disabled. For example, processing circuitry 306 of the shared media equipment device may direct speakers 312 to mute volume.

Figure 15:
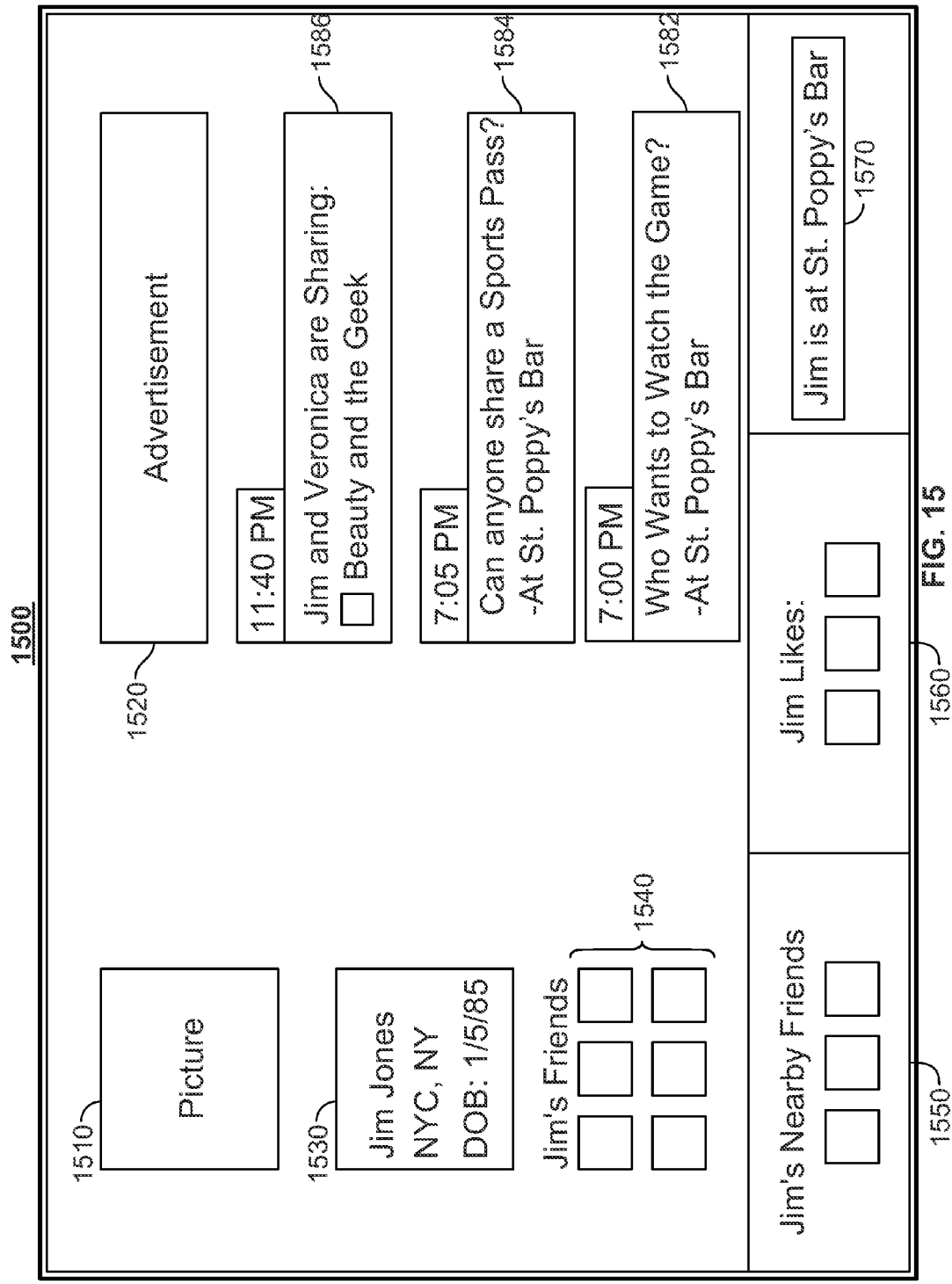
FIG. 15 illustrates a screen 1500 that may be displayed on a user device to show information about a user's account on a social network in accordance with some embodiments of the present disclosure.

FIG. 15 illustrates a screen 1500 that may be displayed on a personal user device to show information about a first user's account on a social network in accordance with some embodiments of the present disclosure. Screen 1500 may include picture region 1510, advertisement region 1520, user region 1530, friends region 1540, nearby friends region 1550, favorites region 1560, location message 1570, update region 1582, update region 1584, and update region 1586. In some embodiments, screen 1500 may be displayed on a personal user device in response to selection of selectable menu option 970 as described above in reference to FIG. 9.

Picture region 1510 may include a photo, avatar, icon, any other suitable identifier of a user, or any combination thereof. User region 1530 may include user profile information about a user such as name, birthday, geographic location, or any other suitable user profile information. Friend region 1540 may include a selectable list of icons that correspond to other users that are connected to the first user in the social network. Nearby friends region 1550 may include a selectable list of icons that indicate friends associated with the first user that are nearby in geographic location to the first user. Favorites region 1560 may include a selectable list of icons corresponding to content assets that are commonly accessed by the user. Location message 1570 may indicate the location of the first user.

Update regions 1582, 1584 and 1586 may include information about status updates of the first user, and temporary assignments of access rights to and from the first user. For example, update region 1586 may include information indicating that the first user and a different user are sharing an access right to a content asset at a certain time. For example, update region 1584 may include information indicating that the first user is requesting a temporary access right at a certain geographic location to access a content asset. In some implementations, update region 1584 may be selected to grant a temporary access right to the first user. For example, in response to receiving a selection of update region 1584, control circuitry 304 of a second personal user device may generate a temporary access right to a content asset and transmit the generated temporary access right to a first personal user device of the first user. For example, in response to receiving a selection of update region 1584, control circuitry 304 of a second personal user device may send a request to a web server 430 or other suitable remote server to generate a temporary access right to a content asset, and update content authorization information associated with the first user to include the temporary access right.

Update region 1582 may include a message from the first user inquiring about interest in viewing a content asset. For example, in response to a selection of selectable menu option 940, control circuitry 304 of a first personal user device may transmit a request to a web server 430 hosting a social network, to display a message indicated in update region 1582, inquiring whether any nearby users are interested in viewing a content asset on a shared media equipment device in a particular location. Advertisement region 1520 may include any suitable advertisement related to either the first user whose user profile is displayed on the screen 1500, a second user who is accessing screen 1500, any of the content assets shown in regions 1560, or any combination thereof.

Screen 1500 may be generated by a web server 430 hosting a social network, and transmitted to a user device of a second user accessing the social network. For example, control circuitry 304 of a web server 430 may retrieve first user profile information associated with a first user, and generate the display of screen 1500 based on the user profile information.

In some embodiments, a second user viewing screen 1500 may request a temporary access right to a content asset by selecting one of the selectable icons in any of regions 1560, or 1586 corresponding to a content asset. For example, control circuitry of a second user device associated with a second user may receive a selection of selectable icons, and in response transmit a request for a temporary access right to the web server 430 hosting the social network. In some implementations, control circuitry of the web server may automatically generate the temporary access right and update second content authorization information associated with the second user to include the temporary access right. In some implementations, control circuitry of the web server may request confirmation from the first user who holds the requested access right, as to whether temporary access may be granted to the second user. In response to receiving confirmation from the first user, control circuitry of the web server may generate the temporary access right and update second content authorization information to include the temporary access right.

It will be understood that the foregoing is only illustrative of the principles of the disclosure, and that various modifications may be made by those skilled in the art without departing from the scope and spirit of the disclosure. It will also be understood that various display, selection and sorting techniques may be made available to the user and examples used herein are only for convenience. Those skilled in the art will appreciate that the disclosure may be practiced by other than the described embodiments, which are presented for purposes of illustration rather than of limitation, and the disclosure is limited only by the claims that follow.

What is claimed is:

1. A method for determining whether a group of users are authorized to view a content asset together, the method comprising:
   identifying, with control circuitry, first and second users that are each within a viewing proximity of a shared display device, wherein identifying comprises determining that the first and second users are able to simultaneously view the content asset on the shared display device, and wherein a shared media equipment device outputs the content asset to the shared display device;
   retrieving, from a storage device, first content authorization information associated with the first user and second content authorization information associated with the second user;
   determining whether the first and second users are authorized to view the content asset based on the retrieved first and second content authorization information, wherein viewing the content asset requires a predetermined authorization;
   enabling viewing of the content asset on the shared display device in response to determining that the first and second users are both authorized to view the content asset; and
   restricting viewing of the content asset on the shared display device in response to determining that the second user is not authorized to view the content asset.

2. The method of claim 1, wherein the viewing proximity comprises a distance within a perceivable range of the shared display device, the perceivable range comprising a distance within which a viewer can view the content asset provided by the shared media equipment device.

3. The method of claim 2, wherein identifying the first and second users further comprises identifying the users by using a wireless detection technique to detect a personal user device belonging to the first user or second user.

4. The method of claim 2, wherein identifying the first and second users further comprises identifying the users by a biometric detection technique comprising facial recognition, heat signature recognition, odor recognition, scent recognition, body shape recognition, voice recognition, and behavioral recognition.

5. The method of claim 1, wherein the content authorization information comprises metadata, an identification number, hash code, digital access right, permission or user profile information,
   wherein the first content authorization information is retrieved from a first personal user device, and the second content authorization information is retrieved from a second personal user device.

6. The method of claim 1, wherein determining whether the first and second users are authorized to view the content asset comprises determining an intersection of access rights and permissions of the first content authorization information of the first user and second content authorization information of the second user.

7. The method of claim 1, further comprising:
   in response to determining that the second user is not authorized to view the content assets, displaying an option on a personal user device associated with the second user, the option allowing the second user to purchase authorization to view the content asset,
   wherein viewing of the content asset is enabled in response to the second user selecting the option with the mobile device.

8. The method of claim 1, further comprising:
   detecting a third user entering the viewing proximity of the shared display device;
   retrieving third content authorization information associated with the third user;
   determining whether the third user is authorized to view the content asset based at least in part on the third content authorization information; and
   in response to determining that the third user is not authorized to view the content asset, indicating by the shared media equipment device that a user within the viewing proximity of the shared display device is not authorized to view the content asset, wherein a shared media equipment device outputs the indication to the shared display device.

9. The method of claim 1, wherein determining whether the first and second users are authorized to view the content asset comprises determining a union of access rights and permissions of the first content authorization information of the first user and the second content authorization information of the second user.

10. The method of claim 8, further comprising:
    in response to determining that third user is not authorized to view the content asset, displaying an option on a portable user device associated with the third user, the option allowing the third user to purchase authorization to view the content asset,
    wherein viewing of the content asset is enabled in response to the third user selecting the option with the personal user device.

11. A system for determining whether a group of users is authorized to view a content asset together, the system comprising:
    control circuitry configured to:
        identify first and second users that are each within a viewing proximity of a shared display device, wherein identifying comprises determining that the first and second users are able to simultaneously view the content asset on the shared display device, and wherein a shared media equipment device outputs the content asset to the shared display device;
        retrieve first content authorization information associated with the first user and second content authorization information associated with the second user;
        determine whether the first and second users are authorized to view the content asset based on the retrieved first and second content authorization information, wherein viewing the content asset requires a predetermined authorization;
        enable viewing of the content asset on the shared display device in response to determining that the first and second users are both authorized to view the content asset; and
        restrict viewing of the content asset on the shared display device in response to determining that the second user is not authorized to view the content asset.

12. The system of claim 11, wherein the viewing proximity comprises a distance within a perceivable range of the shared display device, the perceivable range comprising a distance within which a viewer can view the content asset provided by the shared media equipment device.

13. The system of claim 12, wherein the control circuitry is further configured to:
   identify the users by using a wireless detection technique to detect a personal user device belonging to the first user or second user.

14. The system of claim 12, wherein the control circuitry is further configured to identify the first and second users by a biometric detection technique comprising facial recognition, heat signature recognition, odor recognition, scent recognition, body shape recognition, voice recognition, and behavioral recognition.

15. The system of claim 11, wherein the content authorization information comprises metadata, an identification number, hash code, digital access right, permission or user profile information,
   wherein the first content authorization information is retrieved from a first personal user device, and the second content authorization information is retrieved from a second personal user device.

16. The system of claim 11, wherein the control circuitry is further configured to:
   determine an intersection of access rights and permissions of the first content authorization information of the first user and second content authorization information of the second user.

17. The system of claim 11 wherein the control circuitry is further configured to:
   in response to determining that the second user is not authorized to view the content assets, display an option on a personal user device associated with the second user, the option allowing the second user to purchase authorization to view the content asset,
   wherein viewing of the content asset is enabled in response to the second user selecting the option with the mobile device.

18. The system of claim 11, wherein the control circuitry is further configured to:
   detect a third user entering the viewing proximity of the shared display device;
   retrieve third content authorization information associated with the third user;
   determine whether the third user is authorized to view the content asset based at least in part on the third content authorization information; and
   in response to determining that the third user is not authorized to view the content asset, indicate by the shared media equipment device that a user within the viewing proximity of the shared display device is not authorized to view the content asset, wherein a shared media equipment device outputs the indication to the shared display device.

19. The system of claim 11, wherein the control circuitry is further configured to:
   determine a union of access rights and permissions of the first content authorization information of the first user and second content authorization information of the second user.

20. The system of claim 18, wherein the control circuitry is further configured to:
   in response to determining that third user is not authorized to view the content asset, display an option on a portable user device associated with the third user, the option allowing the third user to purchase authorization to view the content asset,
   wherein viewing of the content asset is enabled in response to the third user selecting the option with the personal user device.

* * * * *